United States Patent [19]

Ninomiya et al.

[11] Patent Number: 4,614,980

[45] Date of Patent: Sep. 30, 1986

[54] MAGNETIC RECORDING AND REPRODUCING APPARATUS FOR RECORDING AND REPRODUCING A VIDEO SIGNAL OBTAINED FROM A HIGH SPEED SCANNING VIDEO CAMERA

[75] Inventors: Takeshi Ninomiya; Hideto Suzuki, both of Kanagawa, Japan

[73] Assignee: Sony Corporation, Tokyo, Japan

[21] Appl. No.: 602,369

[22] Filed: Apr. 20, 1984

[30] Foreign Application Priority Data

Apr. 22, 1983 [JP] Japan ................................. 58-71280
Apr. 22, 1983 [JP] Japan ................................. 58-71281
Apr. 22, 1983 [JP] Japan ................................. 58-71282

[51] Int. Cl.$^4$ ........................................... H04N 5/782
[52] U.S. Cl. ..................................... 358/335; 358/338; 360/9.1; 360/10.1; 360/22; 360/33.1; 369/32
[58] Field of Search ............... 358/335, 338, 347, 213, 358/906, 346; 360/8, 9.1, 10.1, 22, 24, 33.1; 369/32

[56] References Cited

U.S. PATENT DOCUMENTS 4,280,151 7/1981 Tsunekawa ..................... 358/335
4,339,775 7/1982 Lemke et al. ..................... 360/10.3

*Primary Examiner*—Robert L. Richardson

*Attorney, Agent, or Firm*—Lewis H. Eslinger; Alvin Sinderbrand

[57] ABSTRACT

Magnetic recording and reproducing apparatus records and reproduces on or from a magnetic recording tape a high speed video signal obtained from a high speed scanning video camera having a scanning speed N times the scanning speed of a standard video camera generating a standard television video signal, where N is an integer. The apparatus includes a drive for driving the magnetic recording tape to a run at tape speed N times the tape speed of a standard recording apparatus, circuitry for dividing the high speed video signal into N-channel video signals, and an expander for expanding the time axis of the high speed video signal so that each of the N-channel video signals is slightly compressed as compared to the standard television video signal. A modulator modulates each of the video signals the time axes of which are expanded, and a recording and reproducing mechanism includes a rotary drum having N rotary magnetic heads mounted on the circumference thereof with an equal angular distance therebetween to record each of the modulated video signals on the magnetic recording tape as successive tracks and a playback head mounted on the circumference at a predetermined position. The diameter of the rotary drum is in a predetermined relation to that of the standard magnetic recording and reproducing apparatus.

4 Claims, 23 Drawing Figures

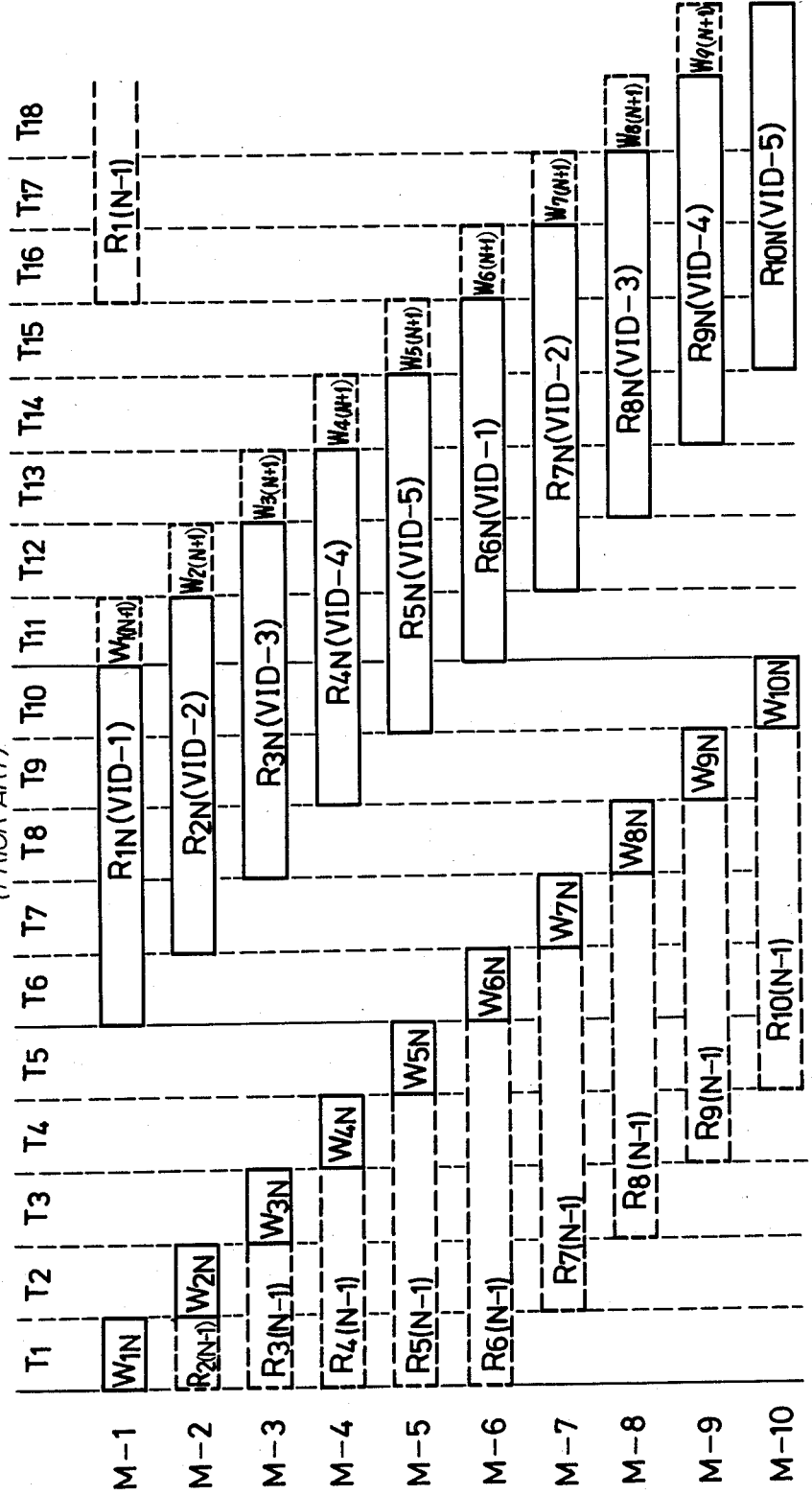

FIG. 8
*(PRIOR ART)*

| | T1 | T2 | T3 | T4 | T5 | T6 | T7 | T8 | T9 | T10 | T11 | T12 | T13 | T14 | T15 | T16 | T17 | T18 |
|---|---|---|---|---|---|---|---|---|---|---|---|---|---|---|---|---|---|---|
| M-1 | W1N | R1N(VID-1) | | | | | W1(N+1) | R1(N+1)(VID-2) | | | | | W1(N+2) | R1(N+2)(VID-3) | | | | |
| M-2 | | W2N | R2N(VID-2) | | | | | W2(N+1) | R2(N+1)(VID-3) | | | | | W2(N+2) | R2(N+2)(VID-4) | | | |
| M-3 | | | W3N | R3N(VID-3) | | | | | W3(N+1) | R3(N+1)(VID-4) | | | | | W3(N+2) | R3(N+2)(VID-5) | | |
| M-4 | | | | W4N | R4N(VID-4) | | | | | W4(N+1) | R4(N+1)(VID-5) | | | | | | | |
| M-5 | | | | | W5N | R5N(VID-5) | | | | | W5(N+1) | R5(N+1)(VID-1) | | | | | | |
| M-6 | | | | | | W6N | R6N(VID-1) | | | | | W6(N+1) | R6(N+1)(VID-2) | | | | | |

MAGNETIC RECORDING AND REPRODUCING APPARATUS FOR RECORDING AND REPRODUCING A VIDEO SIGNAL OBTAINED FROM A HIGH SPEED SCANNING VIDEO CAMERA

BACKGROUND OF THE INVENTION

1. Field of the Invention

The present invention generally relates to a recording and reproducing apparatus for recording and reproducing a video signal and more particularly is directed to a recording and reproducing apparatus for recording and reproducing a video signal obtained from a high speed scanning video camera which can pick up, record and reproduce a phenomenon moving at high speed by using a television camera and a VTR (video tape recorder).

2. Description of the Prior Art

In the prior art, a high speed film camera is proposed as an apparatus for picking up and recording a phenomenon moving at high speed. This high speed film camera, however, has a defect that the phenomenon moving at high speed, which is recorded by such camera, can not be reproduced immediately. To remove the above defect, various researches and technical developments have been made in which a phenomenon moving at high speed is picked up by a television camera, recorded by a VTR or the like, and then reproduced immediately.

As is known well, it takes 1/60 second at minimum for an ordinary television camera to convert one sheet of a picture to an electrical signal. Accordingly, it is impossible for the television camera to pick up a moving object which changes at a speed faster than 1/60 second. To solve this problem, a technique is disclosed in, for example, the publication document of the Japanese patent application examined, No. 26416/1977 in which the visual field of a pickup tube is divided into a plurality of sections, the whole of an object is placed in each one section of the divided sections and the object image on the pickup tube is scanned during the scanning period of time corresponding to each section to thereby enable the phenomenon moving at high speed to be picked up.

Further, in the published document of the Japanese patent application examined, No. 13631/1980, there is disclosed a technique in which the optical image of an object is sequentially projected onto a plurality of pickup tubes having accumulation effect at every constant interval during a constant time period, and the video signals from the respective pickup tubes are respectively supplied to a plurality of recording apparatus to thereby successively record the time image of the phenomenon moving at high speed.

In addition, in the publication document of the Japanese patent application unexamined, No. 2119/1977, there is disclosed a technique in which two image pickup elements or imagers are employed and the deflections thereof are mutually displaced by every ½ frame to thereby produce a video signal of high speed twice the frame speed.

However, according to the technique disclosed in the published document of the Japanese patent application examined, No. 26416/1977, since the visual field is substantially narrowed, only the image of the periphery of the moving object is obtained. Also since the movable range of the moving object is confined within the divided one section, this technique is not suitable for the general use. According to the technique disclosed in the published document of the Japanese patent application examined, No. 13631/1980, since a plurality of image elements having accumulation effect and a plurality of recording apparatus are required, the arrangement thereof becomes complicated, which then becomes significantly inconvenient in practical use. Furthermore, according to the technique disclosed in the publication document of the Japanese patent application unexamined, No. 2119/1977, since this technique requires a plurality of image pickup elements and the recorded pattern on a magnetic tape becomes special, the recorded tape has no compatibility.

In addition, it may be considered that a video signal picked up by the television camera at a scanning speed a plurality of times (N) higher than the ordinary scanning speed is recorded as it is by using the VTR. In that case, it is necessary to set the revolution number of the rotary drum of the tape guide drum at N times the standard value and to set the tape transport speed at N times the standard value. This, however, will cause the following problems.

(1) In order to rotate the rotary drum of the tape guide drum at a revolution number N times the standard revolution number, it is necessary to set the carrier frequency of FM-modulation (frequency-modulation) and the base band frequency both N times higher than the standard values. However, in this case, although the signal recorded at the speed N times the standard value must be reproduced at the normal speed, it is quite difficult to secure the corresponding relation between the emphasis and deemphasis and the characteristics of the recording and reproducing circuits with the frequency stability or the like of the frequency-modulated signal frequency. In addition, the recorded tape has no compatibility.

(2) Since the frequency-modulated carrier frequency becomes N times the normal value, considering the impedance of the rotary magnetic head, the characteristic of the rotary transformer and so on, it is quite difficult to increase the value N.

(3) If the revolution number of the rotary drum of the tape guide drum is set to N times the normal value, there is some fear that the contact pressure of the rotary magnetic head for the magnetic tape is lowered by a so-called air film to lower the recording sensitivity.

Therefore, the assignee of this application has previously proposed a recording apparatus for recording a video signal obtained from a high speed scanning video camera which can record a video signal obtained from a high speed scanning video camera by using a television camera and a VTR (video tape recorder).

Such recording apparatus for recording a video signal obtained from a high speed scanning video camera comprises a memory means for storing therein a video signal derived from a high speed scanning video camera the scanning speed of which is faster than the scanning speed of the standard television signal and a plurality of rotary magnetic heads supplied with the video signals of a plurality of channels read out in parallel from the memory means wherein the video signals of the plurality of channels are recorded on the magnetic tape by the plurality of rotary magnetic heads so as to form adjoining slant tracks sequentially.

A practical example of such previously proposed recording apparatus for recording a video signal obtained from a high speed scanning video camera will hereinafter be described with reference to FIG. 1. This practical example of the recording apparatus employs an image pickup apparatus or high speed scanning video camera the scanning speed of which is five times the scanning speed of a standard television signal of an NTSC (national television systems committee) system.

If a subcarrier frequency, a horizontal frequency, a vertical frequency and a frame frequency of the video signal are respectively taken as $f_{sc}$, $f_H$, $f_V$ and $f_{FR}$, they are expressed as follows:

$$f_{sc} = \frac{910}{4} f_H = 17.9 \text{ (MHz)}$$

$$f_H = \frac{525}{2} f_V = 78.75 \text{ (kHz)}$$

$$f_V = 300 \text{ (Hz)}$$

$$f_{FR} = \frac{1}{2} f_V = 150 \text{ (Hz)}$$

In FIG. 1, a reference numeral 1 designates an image pickup apparatus or video camera which includes an image element such as a picture tube, a solid state image pickup element or the like and a driving means, a signal processing circuit and the like corresponding thereto. In this example, the video camera 1 also includes an encoder to produce a composite color video signal of the NTSC system. Such encoder, however, can be provided at a signal processing circuit system at the latter stage of the video camera 1 (at the next stage of, for example, D/A (digital-to-analog) converter which will be described later).

The composite color video signal from the video camera 1 is supplied to an A/D (analog-to-digital) converter 2 thereby digitized. A reference numeral 3 designates a synchronizing signal separating circuit 3 which receives the video signal from the video camera 1 to separate therefrom various synchronizing signals. A color framing signal from the video camera 1 and horizontal and vertical synchronizing signals from the synchronizing signal separating circuit 3 are supplied to a clock signal generating/system control circuit 4. A clock signal with frequency $f_{W\text{-}CK}$ of, for example, $4f_{SC}$ (=71.6 MHz) from the circuit 4 is supplied to the A/D converter 2. The control signal from the circuit 4 is supplied through an amplifier 5 to a stationary or fixed magnetic head 6 thereby recorded on a magnetic tape (not shown) along its one side edge.

The digitized video signal from the A/D converter 2 is supplied through on-off switches $S_1$ to $S_{10}$ to a field memory 5 (memories M - 1 to M - 10) thereby written therein with the data rate of the write frequency $f_{W\text{-}CK}$. The digitized video signals read out from the field memories M - 1, M - 6; M - 2, M - 7; M - 3, M - 8; M - 4, M - 9; and M - 5, M - 10 with the data rate of a read frequency $f_{R\text{-}CK}$ (=1/5 $f_{W\text{-}CK}$) are respectively supplied through change-over switches $S_{11}$ to $S_{15}$ (each switch having fixed contacts a, b and a movable contact c) to D/A converters DA - 1 to DA - 5 thereby converted to the form of analog signals in response to the clock signal with the read frequency $f_{R\text{-}CK}$. The analog video signals VID - 1 to VID - 5 from the D/A converters DA - 1 to DA - 5 are supplied to frequency modulators MD - 1 to MD - 5 thereby frequency-modulated. The frequency-modulated video signals are respectively supplied through amplifiers $A_1$ to $A_5$ to five rotary magnetic heads $H_A$ to $H_E$ thereby recorded on the magnetic tape to sequentially form slant adjacent tracks.

Each of the frequency modulators MD - 1 to MD - 5 includes means for adjusting the video level, carrier frequency, deviation, differential gain, differential phase, frequency characteristic and the like by which characteristics of respective channels can be made uniform.

The recording apparatus of this example consists of a television camera and a VTR (video tape recorder) of helical scan system. While in this embodiment, the section from the video camera 1 to the D/A converters DA - 1 to DA - 5 is taken as the television camera side and the section from the frequency modulators MD - 1 to MD - 5 to the rotary magnetic heads $H_A$ to $H_E$, and the amplifier 5 and the fixed magnetic head 6 is taken as the VTR side, the border between the television camera side and the VTR side is not limited to the above.

The operation of the apparatus shown in FIG. 1 will be described with reference to FIG. 2. In FIG. 2, reference letters $T_1$, $T_2$, $T_3$ . . . designate field periods, each period having a time width T (=1/$f_V$).

During the period $T_1$, only the switch $S_1$ is turned on to allow the digitized video signal to be written in the memory M - 1. During the succeeding period $T_2$, only the switch $S_2$ is turned on to allow the video signal to be written in the memory M - 2. In like manner, the image signal is sequentially written in the memories M - 3 to M - 10.

In the field period $T_6$, the movable contact c of the switch $S_{11}$ is connected to the fixed contact a so that a video signal $W_{1N}$ written in the memory M - 1 during the field period $T_1$ is started to be read out therefrom. Since $f_{R\text{-}CK}$=1/5 $f_{W\text{-}CK}$ 5 field periods $T_6$ to $T_{10}$ are required to read the video signal $W_{1N}$ and then to provide a read signal $R_{1N}$.

Similarly in the field period $T_7$, the video signal $W_{2N}$ written in the memory M - 2 during the field period $T_2$ is started to be read out. In like manner, 5 field periods $T_7$ to $T_{11}$ are required to read the video signal $W_{2N}$ and to provide a read signal $R_{2N}$. The same operation is carried out hereinafter. In the field period $T_{11}$, the movable contact c of the switch $S_{11}$ is connected to the fixed contact b so that the video signal $W_{6N}$ stored in the memory M - 6 is started to be read out therefrom and thus a read signal $R_{6N}$ is obtained. Accordingly, if the written digital video signals $W_{1N}$, $W_{2N}$, . . . are controlled to have one field period from the beginning of each field, the read video signals $R_{1N}$, $R_{2N}$ . . . become the same as they are read out from the beginning of each field so that the D/A converters DA - 1 to DA - 5 generate the analog video signals VID - 1 to VID - 5 which have 5 phases with a phase interval of 1/$f_V$=1/5 ·1/$f_V$ between adjacent ones.

The video signal VID - 1 consists of the video signals $R_{1N} \rightarrow R_{6N} \rightarrow R_{1(N+1)} \rightarrow$ . . . which are sequentially read. If, now, $W_{1N}$ is taken as the video signal of NTSC system in the first field, $W_{2N}$ is the video signal in the second field, . . . $W_{4N}$ is the video signal in the fourth field, $W_{5N}$ is the video signal in the first field, $W_{6N}$ is the video signal in the second field. . . Thus, the video signal VID - 1 consists of the sequential video signal $R_{1N}$ (first field)$\rightarrow R_{6N}$ (second field)$\rightarrow R_{1(N+1)}$ (third field)$\rightarrow R_{6(N+1)}$ (fourth field)$\rightarrow R_{1(N+2)}$ (first field). . . Therefore, the video signal VID - 1 becomes the video signal of NTSC system with succession, namely, excellent color framing property. Similarly, the video signals VID - 2 . . . VID - 5 become the sequential video signals of NTSC system. Finally, respective D/A converters produce the video signals of NTSC system with 5 phases.

FIGS. 3A and 3B illustrate the arrangement of the respective rotary magnetic heads (record heads) $H_A$ to $H_E$. As shown in FIGS. 3A and 3B, the five rotary magnetic heads $H_A$ to $H_E$ are mounted on a rotary drum RD of a tape guide drum GD with an angular distance of 72° between adjacent ones. The rotary drum RD is rotated once at every $1/f_V$, namely, at 60 Hz in the clockwise direction. A reference letter SD designates a fixed drum. A record tape (not shown) is wrapped around the tape guide drum GD along its external periphery from points $P_2$ to $P_1$ in the counter-clockwise direction. The tape wrapping angle is approximately 344° and the tape transport speed is five times the standard value vt of the normal tape transport speed.

The tape recorded under the above condition must satisfy all dimensions which are determined by the standard or normalization. In FIG. 4, a recorded track pattern vector $\overrightarrow{QP_1}$ on the tape becomes the sum of a tape transport vector $\overrightarrow{QP_2}$ and a drum rotation vector $\overrightarrow{P_2P_1}$ as expressed in the following equations.

$$\overrightarrow{QP_1} = \overrightarrow{QP_2} + \overrightarrow{P_2P_1}$$

$$\overline{QP_1}\cos\theta_c - \overline{P_2P_1}\cos\theta_H = 5vt$$

$$\overline{QP_1}\sin\theta_c = \overline{P_2P_1}\sin\theta_H = h$$

where $\theta_c$ and $\theta_H$ respectively represent the track angle and the helix angle.

From the above two equations, $\overline{P_2P_1}$ and $\theta_H$ are determined. By way of example, h, vt and $\overline{QP_1}$ are given as h=18.4 mm, vt=4.07 mm/sec and $\overline{QP_1}$=410.764 mm.

$$\overline{P_2P_1} = \sqrt{h^2 + (\overline{QP_1}\cos\theta_c - 5vt)^2}$$

$$= \sqrt{25vt^2 - 10vt\,\overline{QP_1}\cdot\cos\theta_c + \overline{QP_1}^2}$$

$$\approx \overline{QP_1}\sqrt{1 - 10\frac{vt}{\overline{QP_1}}\cos\theta_c}$$

$$\theta_H = \sin^{-1}\frac{h}{\overline{P_2P_1}}$$

$\overline{P_2P_1}$ and $\theta_H$ are respectively 390.4357 mm and 2.70117° (=2°42′04″). Thus, $\theta_H$ is selected to be the inclination angle between the tape and the drum in such a manner that $\overline{P_2P_1}$ may equal to 344°/360° of the external periphery of the tape guide drum GD.

When reproducing the tape by the VTR of SMPTE (society of motion picture and television engineers) type C, in order to form on the tape a slant track in which the relative speeds of the rotation head and the tape transport speed are coincident with each other, the external diameter of the tape guide drum must be selected smaller than that of the SMPTE type C VTR by a predetermined amount. This will hereinafter be described with reference to FIG. 5. In FIG. 5, a relative speed or velocity v between the rotary magnetic head and the tape becomes the sum of a tape transport speed $\overrightarrow{5vt}$ (vt is the standard tape running speed or velocity of the tape of the SMPTE type C VTR at normal running) and a linear velocity or speed $\overrightarrow{vh}$ of the rotary magnetic head as expressed by the following equation.

$$\overrightarrow{v} = \overrightarrow{vh} + \overrightarrow{5vt}$$

If a length (track length) of a slant track formed on the magnetic tape by the rotary magnetic head upon still playback of the SMPTE type C VTR is taken as lc, the track length lc is expressed by the following equation.

$$lc = \pi Dc \cdot (\phi c/360)$$

where DC is the external diameter of the tape guide drum of the SMPTE type C VTR and $\phi c$ is the tape wrapping angle thereof (=340°).

A track length l of a slant track formed on the tape when the tape transport speed is five times the normal tape speed is expressed as $$l = \pi D \cdot (\phi c/360)$$

where D is the external diameter of the tape guide drum of the VTR in this practical example.

Accordingly, $lc^2$ and $l^2$ are respectively expressed by the following equations.

$$lc^2 = h^2 + (L\cos\theta_c - vt)^2$$

$$l^2 = h^2 + (L\cos\theta_c - 5vt)^2$$

where h is the length of the track on the tape in its width direction and L is the track length on the tape of the SMPTE type C VTR when the tape is transported at speed five times the normal tape speed.

Consequently, Dc/D is expressed as follows:

$$Dc/D = \{h^2 + (L\cos\theta_c - vt)^2\}^{\frac{1}{2}} \times \{h^2 + (L\cos\theta_c - 3vt)\}^{-\frac{1}{2}}$$

Thus the outer diameter D(<Dc) of the tape guide drum is selected.

The tape pattern of the tape recorded by the tape guide drum, the rotary magnetic head, the tape transport system and so on, which are determined as above, can satisfy the standards of the SMPTE type C VTR.

FIG. 6 shows the tape pattern suited for the standard of the SMPTE type C VTR and the positional relation between the rotary magnetic heads $H_A$ to $H_E$ and the corresponding slant tracks. In FIG. 6, a reference letter TP designates a magnetic tape and $T_A$ to $T_E$ slant tracks corresponding to the rotary magnetic heads $H_A$ to $H_E$. A reference letter $T_{CTL}$ designates a control signal track.

When the tape recorded as described above is reproduced by the VTR meeting with the standard of the SMPTE type C format under the normal playback mode, it is possible to reproduce the video picture moving at high speed in the slow motion mode.

Another practical example of the previously proposed recording apparatus for recording a video signal obtained from a high speed scanning video camera will be described with reference to FIG. 7. If the switches $S_1$ to $S_{10}$, the memory 5, the switches $S_{11}$ to $S_{15}$ and the D/A converters DA-1 to DA-5 are taken as one memory 5′, this memory 5′ will be modified as follows. By way of example, if a serial memory such as a CCD (charge-coupled device) and a shift register is used, the memory 5′ can be formed by six field memories, switches, D/A converters and so on. Like parts corresponding to those in FIG. 1 are marked with the same references and will not be described.

The operation of the memory 5' will be described with reference to FIG. 8. In this case, let it be assumed that the memory 5' includes six field memories M-1 to M-6. During the field period $T_1$, the digitized video signal is written in and then stored in the memory M-1. During the succeeding field period $T_2$, the video signal is written in the memory M-2. Similarly, the video signal is sequentially written in the memories M-3 to M-6 hereinafter. In the field period $T_2$, the video signal $W_{1N}$ written in the memory M-1 during the field period $T_1$ is started to be read out therefrom. Since $f_{R-CK} = 1/5 \cdot f_{W-CK}$, five field periods $T_2$ to $T_6$ are required to read the video signal $W_{1N}$ and to provide the read signal $R_{1N}$.

Similarly in the field period $T_3$, the video signal $W_{2N}$ stored in the memory M-2 during the field period $T_2$ is started to be read out therefrom. In like manner, five field periods $T_3$ to $T_7$ are required to read the video signal $W_{2N}$ and to provide the read signal $R_{2N}$. The same operation will be carried out hereinafter. In the field period $T_7$, the movable contact c of the switch $S_{11}$ is connected to the fixed contact b so that the video signal $W_{6N}$ stored in the memory M-6 is started to be read out therefrom to produce the read signal $R_{6N}$. Accordingly, when the written digital video signals $W_{1N}$, $W_{2N}$ . . . are controlled to have one field period from the beginning of each field, the read out video signals $R_{1N}$, $R_{2N}$ . . . become such ones as read out from the beginning of each field so that the D/A converters DA-1 to DA-5 produce the analog video signals VID-1 to VID-5 of 5 phases with a phase interval of $1/f_V = 1/5 \cdot 1/f_V$ between adjacent ones.

The video signal VID-1 consists of the video signals $R_{1N} \rightarrow R_{6N} \rightarrow R_{1(N+1)} \rightarrow$ . . . which are read sequentially. If, now, $W_{1N}$ is taken as the video signal of NTSC system in the first field, $W_{2N}$ is the video signal of the second field, . . . , $W_{4N}$ is the video signal of the fourth field, $W_{5N}$ is the video signal of the first field and $W_{6N}$ becomes the video signal of the second field. . . . Consequently, the video signal VID-1 consists of the sequential video signals $R_{1N}$ (first field)$\rightarrow R_{6N}$ (second field)$\rightarrow R_{1(N+1)}$ (third field)$\rightarrow R_{6(N+1)}$ (fourth field)$\rightarrow R_{1(N+2)}$ (first field). . . In other words, the video signal VID-1 apparently becomes the sequential video signal of NTSC system with excellent color framing property. Similarly, the video signals VID-2 . . . VID-5 become the sequential video signals of NTSC system. As a result, the D/A converters DA-1 to DA-5 produce the video signals of NTSC system with 5 phases.

If the memory 5' in FIG. 7 uses a RAM (random access memory), the writing and the reading can be carried out in a time sharing manner so that 5 field memories are sufficient.

While in the practical example shown in FIG. 1 the synchronizing signal is separated from the composite video signal derived from the video camera 1 and then is supplied to the clock signal generating/system control circuit 4, it is also possible that as shown in FIG. 7 the synchronizing signal is generated from the clock signal generating/system control circuit 4, which then is fed to the video camera 1.

In order that the tape recorded by the above recording apparatus is reproduced by the VTR of the SMPTE type C format, it is necessary that the slant tracks formed on the magnetic tape by five rotary magnetic heads $H_A$ to $H_E$ have each the same characteristic since the channel of the rotary magnetic head and the reproducing circuit of the VTR are made for one channel.

To this end, there is required an apparatus which reproduces the slant tracks recorded on the magnetic tape by the respective rotary magnetic heads $H_A$ to $H_E$, checks the same and adjusts and makes uniform the characteristics of the recording systems relative to the rotary magnetic heads $H_A$ to $H_E$ on the basis of the checked results.

The above detecting/adjusting apparatus will hereinafter be described with reference to FIGS. 9A, 9B and FIG. 10. As shown in FIGS. 9A and 9B, in addition to the rotary magnetic heads $H_A$ to $H_E$ shown in FIG. 3, a rotary magnetic head $H_M$ for monitor playback use is mounted on the rotary drum RD of the tape guide drum GD. In the example of FIG. 9, the rotary magnetic head $H_M$ is provided at substantially center between the rotary magnetic heads $H_C$ and $H_D$, for example. An angle $\theta_D$ between the heads $H_C$ and $H_M$ is about 36°, and reference letter $\overline{MN}$ designates a stepped length of the head $H_M$ relative to the heads $H_A$ to $H_E$.

As shown in FIG. 10, the output terminal of the rotary magnetic head $H_M$ for monitor playback use is connected through an amplifier $A_M$ to the input terminal of a playback equalizer 6', and the output terminal of the playback equalizer 6' is connected to a fixed contact a of a change-over switch $S_{22}$. On the other hand, the output terminals of the frequency-modulators MD-1 to MD-5 for the rotary magnetic heads $H_A$ to $H_E$ are respectively connected to fixed contacts a to e of a change-over switch $S_{21}$, and a movable contact f of the change-over switch $S_{21}$ is connected to the input terminal of a mixing circuit 7 which mixes a white reference signal. The output terminal of the mixing circuit 7 is connected to a fixed contact b of the change-over switch $S_{22}$ and a movable contact c thereof is connected to the input terminal of an FM demodulator 8.

The operation of the detecting/adjusting apparatus will be described. At first, the movable contact c of the change-over switch $S_{22}$ is connected to the fixed contact a, the standard tape recorded by the VTR of SMPTE C type format is transported at speed five times the normal speed, the tape is reproduced by the rotary magnetic head $H_M$, and then the playback system is adjusted so as to make its characteristic meet with the standard or normalization. Thereafter, a test signal (for example, a white signal) is supplied to each of the FM modulators MD-1 to MD-5. Then, the movable contact c of the change-over switch $S_{22}$ is connected to its fixed contact b. In the mixing circuit 7, a reference signal with the frequency same as that of the white signal is inserted into the vertical synchronizing signal intervals of the modulated test signals from the FM modulators MD-1 to MD-5. By operating the change-over switch $S_{21}$, the level of the demodulated signal of each channel from the FM demodulator 8 is compared with the level of the reference signal and the gain of the recording system of each channel is adjusted to make the above levels equal to one other.

Thereafter, the movable contact c of the changeover switch $S_{22}$ is connected to its fixed contact a. A test pattern signal is supplied to the respective FM modulators MD-1 to MD-5 and the modulated test pattern signals therefrom are sequentially recorded on the magnetic tape TP by the rotary magnetic heads $H_A$ to $H_E$ so as to form the slant tracks. At that time, the rotary magnetic head $H_M$ for monitor playback use (this head $H_M$ can be displaced in the direction substantially perpendicular to the tracing direction) is displaced to trace and reproduce the slant tracks formed by the magnetic heads $H_A$ to $H_E$. In consequence, various characteristics of the recording system of each channel are adjusted so as to make video level, clamp level, preemphasis frequency characteristic, differential gain, differential phase, waveform characteristic and so on of the test pattern signal, which is each demodulated output from the FM-modulator 8, equal to those of the test pattern signal formed by reproducing the standard tape. Thus the characteristics of the recording systems of the rotary magnetic heads $H_A$ to $H_E$ can be made uniform.

A drive circuit for displacing the monitor playback rotary magnetic head $H_M$ will be described with reference to FIG. 11. The rotary magnetic head $H_M$ for monitor playback use is mounted through a bimorph leaf 10 as the electromechanical transducer element to the rotary drum RD of the tape guide drum GD shown in FIG. 9. On this bimorph leaf 10 is attached a strain gauge 11 as a mechanical-electric transducer element which detects the displacement of the bimorph leaf 10 or the rotary magnetic head $H_M$.

In a dynamic tracking servo circuit 24, the displacement detected output from the strain gauge 11 is supplied through an amplifier 12 to a known dynamic tracking control circuit 13 which is used in the VTR of SMPTE type C format or the like. The control signal from the control circuit 13 is supplied through an on-off switch $S_{32}$, a composer (adder) 14 and a dynamic tracking drive circuit 15 to the bimorph leaf 10 as a displacement drive signal.

Further, the displacement detected signal from the amplifier 12 is supplied through a low-pass filter 16, an amplifier 17 and an on-off switch $S_{31}$ to a hold capacitor 18. The terminal voltage across the capacitor 18 is supplied through an amplifier 19 to a composer (subtracter) 20 and thereby subtracted from the output of the amplifier 17. The output from the composer 20 is supplied to other composer (subtracter) 21 and thereby subtracted from a D.C. voltage $E_0$ derived from a movable contact f of a change-over switch $S_{35}$ in a D.C. voltage generating means 25. The output from the composer 21 is supplied through an amplifier 22 and an on-off switch $S_{33}$ to the composer 14 and thereby added to the output from the dynamic tracking control circuit 13. To fixed contacts a to e of the change-over switch $S_{35}$ are respectively applied D.C. voltages Ea ($>0$), Eb ($>0$), Ec ($=0$), Ed ($<0$) and Ee ($<0$).

A reference numeral 23 designates an erase signal generating circuit for generating an attenuation vibrating erase signal which converges to 0V. The erase signal therefrom is supplied through an on-off switch $S_{34}$ to the composer 14.

The operation of the circuit shown in FIG. 11 will be described with reference to FIG. 12. FIG. 12 shows the tracks on the tape and the magnetic heads at some instant in the recording mode, or an instant when the rotary head $H_c$, for example, has just finished tracing one track. In FIG. 12, reference letters $T_A$ to $T_E$ designate tracks respectively traced by the heads $H_A$ to $H_E$, and M designates a neutral position of the playback movable head $H_M$ when the bimorph leaf 10 is in the non-bias state. A straight line $\overline{MN}$ designates a line along which the movable head $H_M$ is moved. The position M of the playback movable head $H_M$ is placed on the track $T_A$ traced by the head $H_A$. When the movable head $H_M$ is moved by 2 track pitches along the line $\overline{MN}$ in the positive direction, the position M is on the track $T_D$. When the movable head $H_M$ is moved by one track pitch in the positive direction, the position M is on the track $T_E$. When the movable head $H_M$ is moved by one track pitch in the negative direction, the position M is on the track $T_B$. When the movable head $H_M$ is moved by 2 track pitches in the negative direction, the position M is on the track $T_c$. Thus, the respective tracks can be reproduced. In practice, the position of the movable head $H_M$ is determined in such a manner that the N may be positioned between the tracks $T_D$ and $T_c$ on the track on which the M is positioned. In this case, if the N is positioned at the middle point between the tracks $T_D$ and $T_c$, the line $\overline{MN}$ becomes 2.5 track pitches. In general, the line $\overline{MN}$ is given as $$\overline{MN} \approx 2p + \overline{CN} \tan(\theta_H - \theta_C)$$

where p is the track pitch, C is the position of the head $H_c$, $\theta_H$ is the helix angle and $\theta_C$ is the track angle. In the above equation, if p=0.18 mm and $\overline{CN} \tan(\theta_H - \theta_C) = 0.5p$, $\overline{MN}$ becomes 0.45 mm.

In FIG. 11, when upon recording mode the switch $S_{32}$ is turned off once to open the dynamic tracking loop and thereafter the switch $S_{34}$ is turned on to apply the erase signal to the bimorph leaf 10 of the head $H_M$ whereby the position of the bimorph leaf 10 is returned to the neutral position. At that time, the head $H_M$ should trace the track $T_A$. Under this state, the dynamic tracking loop is closed once. At this time, the head $H_M$ traces the track $T_A$ with just tracking. At that time, when the switch $S_{33}$ is turned off and the switch $S_{31}$ is turned on, the output from the low-pass filter 16 is held in the capacitor 18. After the switch $S_{31}$ is turned off and the switch $S_{33}$ is turned on, when the movable contact f of the switch $S_{35}$ is connected to the fixed contact a, the voltage Ea corresponding to 2 track pitches of the output from the strain gauge 11 is amplified by the amplifier 22 and then supplied to the circuit 15 so that the output from the strain gauge 11 is substantially made coincident with the voltage Ea. Thus, the head $H_M$ is moved by 2 track pitches to trace the corresponding track.

When the movable contact f of the switch $S_{35}$ is sequentially connected to the fixed contacts b ... e hereinafter, the head $H_M$ traces the respective tracks $T_A$ to $T_E$.

Another practical example of the recording apparatus for recording a video signal obtained from a high speed scanning camera previously proposed will hereinafter be described with reference to FIG. 13. In FIG. 13, like parts corresponding to those in FIG. 1 are marked with the same references and will not be described. This example uses a video camera the scanning speed of which is three times the scanning speed of the standard television signal of the NTSC system.

If the subcarrier frequency, horizontal frequency, vertical frequency and frame frequency of the video signal are respectively taken as $f''_{SC}$, $f''_H$, $f''_V$ and $f''_{FR}$, these are expressed as follows:

$$f''_{SC} = \frac{910}{4} \cdot f_H = 10.7 \text{ (MHz)}$$

$$f''_H = \frac{525}{2} \cdot f_V = 47.25 \text{ (kHz)}$$

$$f''_V = 180 \text{ (Hz)}$$

$$f''_{FR} = \frac{1}{2}f'_V = 90 \text{ (Hz)}$$

The digitized video signal from the A/D converter 2 is supplied through the on-off switches $S_1$ to $S_6$ to the field memory 5 (including memories M - 1 to M - 6) and written therein with the data rate of the write frequency $f'_{W-CK}$. The digitized video signals read out from the field memories M - 1, M - 4; M - 2, M - 5; and M - 3, M - 6 with the data rate of the read frequency $f_{R-CK}(=\frac{1}{3}f'_{W-CK})$ are respectively supplied through change-over switches $S_{11}$ to $S_{13}$ (each of which includes the fixed contacts a, b and the movable contact c) to the D/A converters DA - 1 to DA - 3 thereby converted to the form of analog signals in response to the clock signal with the read frequency $f_{R-CK}$. The analog video signals VID - 1 to VID - 3 from the D/A converters DA - 1 to DA- 3 are respectively supplied to frequency modulators MD - 1 to MD - 3 thereby frequency-modulated. The frequencymodulated video signals VID - 1 to VID - 3 are respectively supplied through amplifiers $A_1$ to $A_3$ to three rotary magnetic heads $H_A$ to $H_C$, which are located with an angular distance 120° between adjacent ones, thereby recorded on the magnetic tape so as to sequentially form adjoining slant tracks.

The operation of the apparatus shown in FIG. 13 will be described with reference to FIG. 14. In FIG. 14, reference letters $T_1, T_2, T_3$ . . . designate field periods, each of which has a time width $T (=1/f''_V)$.

During the period $T_1$, only the switch $S_1$ is turned on so that the digitized video signal is written in the memory M - 1. During the next period $T_2$, only the switch $S_2$ is turned on to allow the digitized video signal to be written in the memory M - 2. In like manner, the digitized video signals are sequentially written in the memories M - 3 to M - 6 hereinafter.

In the field period $T_4$, the movable contact of the switch $S_{11}$ is connected to its fixed contact a so that the video signal $W_{1N}$ stored in the memory M - 1 during the field period $T_1$ is started to be read out therefrom. Since $f_{R-CK}=\frac{1}{3}f'_{W-CK}$, 3 field periods $T_4$ to $T_6$ are required to read the video signal $W_{1N}$ and to provide the read signal $R_{1N}$.

Similarly, in the field period $T_5$, the video signal $W_{2N}$ stored in the memory M - 2 during the field period $T_2$ is started to be read out therefrom. Also three field periods $T_5$ to $T_7$ are required to read the video signal $W_{2N}$ and to provide the read signal $R_{2N}$. The same operation will be carried out. In the field period $T_{11}$, the movable contact of the switch $S_{11}$ is connected to its fixed contact b so that the video signal $W_{4N}$ stored in the memory M - 4 is read out therefrom to thereby obtain the read signal $R_{4N}$. Thus, when the written digital video signals $W_{1N}, W_{2N}$ . . . are controlled to have one field amount from the beginning of each field, the read video signals $R_{1N}, R_{2N}$. . . become such ones as read out from the beginning of each field. Accordingly, the D/A converters DA - 1 to DA - 3 produce 3-phase analog video signals VID - 1 to VID- 3 with a phase distance of $1/f''_V=\frac{1}{3}\cdot 1/f_V$ between adjacent ones.

The video signal VID - 1 consists of the video signals $R_{1N} \rightarrow R_{4N} \rightarrow R_{1(N+1)} \rightarrow$ . . . which are sequentially read out. If, now, $W_{1N}$ is taken as the video signal of the NTSC system in the first field, $W_{2N}$ becomes the video signal of the second field . . . , $W_{4N}$ the video signal of the fourth field, $W_{5N}$ the video signal of the first field, and $W_{6N}$ the video signal of the second field, . . . Accordingly, the video signal VID - 1 consists of the video signal $R_{1N}$ (first field)$\rightarrow R_{4N}$ (fourth field)$\rightarrow R_{1(N+1)}$ (third field)$\rightarrow R_{4(N+1)}$ (second field)$\rightarrow R_{1(N+2)}$ (first field) . . . thus the color framing thereof being damaged. Therefore, if the video signals are encoded after being converted in the form of digital to analog signals, it is necessary for the video signal $R_{4N}$ (fourth field), $R_{4(N+1)}$ (second field) . . . to invert the phase of the carrier chrominance signal thereof. The video signals VID - 2 to VID- 3 must undergo the same processing. Accordingly, in this case, if the color encoder which produces the composite color video signal of the NTSC system in the video camera 1 is provided with means for inverting the phase of the carrier chrominance signal, signals having no apparent color framing property can be produced as the video signals VID - 1 to VID - 3.

Consequently, according to the previously proposed recording apparatus, the color video signal which requires the tracing speed N times the normal value of the NTSC system is produced from the video camera as the form of the component signal and then written in the memory the storage capacity of which is N fields or above. The N-channel component video signals having the normal tracking speed are produced from the memory and then encoded to the signals of the NTSC system to thereby produce the NTSC color video signals. The NTSC color video signals are then supplied to N rotary magnetic heads and the N-channel color video signals are recorded on the magnetic tape so as to form adjoining slant tracks sequentially. In the previously proposed recording apparatus for recording a video signal obtained from a high speed scanning video camera, if N is $4n+1$ or $4n-1$ (where $n=1, 2, 3, \ldots$), the arrangement of the color encoder becomes different in correspondence therewith. When $N=4n+1$, the color encoder may be an ordinary encoder of the NTSC system. On the other hand, when $N=4n-1$, in order to obtain the color video signal with the color framing property under being recorded on the tape, the color encoder of the NTSC system must be modified so as to invert the phase of the color subcarrier signal of each channel at every field.

In the previously proposed recording apparatus, also when the color video signal of SECAM system is processed, the color encoder must carry out the same color framing operation as that of the color video signal of NTSC system.

For the color video signal of PAL (phase alteration line) system, when $N=8n+1$ (n is an even number and $N=4n+1$, where $n=1, 2, 3, \ldots$), the color encoder may be an ordinary encoder of PAL system. When $N=8n-3$ (n is an odd number and $N=4n+1$, where $n=1, 2, 3, \ldots$), the color encoder must be modified so as to produce the color video signal with the color framing under being recorded on the tape when the color video signal is encoded after being converted in the form of digital to analog signals for the PAL system.

Accordingly, when N is odd number of 3 or above, the arrangement of the color encoder becomes simple. If this simple arrangement of the color encoder is not considered, N may be an even number.

According to the above recording apparatus for recording a video signal obtained from a high speed scanning video camera, a phenomenon moving at high speed can easily be picked up and recorded by use of a television camera and a VTR. The tape recorded by such recording apparatus can be reproduced by the VTR of the normal system, and hence it is possible to obtain the recorded tape which has the compatibility.

When $N=4n\pm1$ ($n=1, 2, 3, \ldots$), the arrangement of the color encoder is made simple for each television system.

In the above examples, the recording apparatus is described, which records the video signal derived from the television or video camera having the line scanning speed three and five times the standard television signal so as to be reproducible by the VTR of SMPTE C type format, or the tape having the compatibility. In this case, various variations and modifications can be considered as the application of the above technical idea. More particularly, it is possible to record the video signal derived from a television camera having a line scanning speed, for example, five times, $5\times2=10$ times and $5\times3=15$ times that of the standard television signal. To this end, the television camera must be controlled to make the line scanning speed as $5\times M$ times ($M=1, 2, 3, \ldots$) that of the standard television signal. If the revolution number of the rotary drum is increased M times the normal revolution number with the tape speed five times the normal speed, it is possible to record video signals of various line scanning speeds. In this case, if the revolution number of the rotary drum is made M times the normal revolution number, there is some fear of the aforementioned defects, or corresponding relation between emphasis and deemphasis, difficulty for securing the characteristic of the recording and reproducing circuit and problems of rotary transformer characteristic and the air film or the like. However, the inventor of the present invention ascertains that even if the revolution number of the rotary drum is made three times the normal revolution number, the above defects do not become significant. Whereas, if the revolution number of the rotary drum is made four or above times the normal revolution number, the above defects can not be neglected and can not be compensated for.

Further examples of the recording apparatus for recording a video signal obtained from a high speed scanning video camera in which the revolution number of the rotary drum is selectively switched to will hereinafter be described with reference to FIGS. 15 and 16. In FIGS. 15 and 16, except an apparatus for selecting a line scanning speed of a television camera, like parts corresponding to those in FIG. 1 are marked with the same references and will not be described.

According to the apparatus shown in FIG. 15, the recording apparatus comprises memory means for storing a video signal derived from a video camera the scanning speed M·N·Sn of which is M·N (where M and N are natural numbers) times the scanning speed Sn of the standard television signal and N rotary magnetic heads supplied with video signals of N channels read out in parallel from the memory means to have the scanning speed M·Sn which is M times the scanning speed Sn of the standard television signal and rotating at a revolution number M times the normal revolution number wherein the value of M in the scanning speed M·N·Sn of the video camera is changed in multiple stages, the revolution number of the rotary magnetic heads is changed in multiple stages in accordance with the change of the value of M, and the video signals of N-channels are recorded on the magnetic tape by N rotary magnetic heads so as to sequentially form adjoining slant tracks.

According to the apparatus shown in FIG. 16, the recording apparatus comprises memory means for storing a video signal derived from a video camera the scanning speed M·N·Sn of which is M·N (where M and N are natural numbers) times the scanning speed Sn of a standard television signal and 2N rotary magnetic heads supplied with video signals of N-channels read out in parallel from the memory means to have the scanning speed M·Sn M times the scanning speed Sn of the standard television signal and rotating at a revolution number M/2 times the field number of the standard television system, wherein the scanning speed M·N·Sn the video camera is changed in multiple stages by changing the value of M, the revolution number of the rotary magnetic heads is changed in multiple stages in accordance with the change of the value of M, and the video signals of N-channels are recorded on the magnetic tape by the 2N rotary magnetic heads so as to sequentially form adjoining slant tracks.

According to the apparatus shown in FIGS. 15 and 16, the phenomenon moving at high speed can easily be picked up and recorded by using the television camera and the VTR. And, the line scanning speed of the television camera can be changed in accordance with the moving phenomenon.

The previously proposed recording apparatus shown in FIGS. 15 and 16 will hereinafter be described in detail.

In FIG. 15, a reference numeral 1 designates an imager or a video camera which includes an image element such as a pickup tube, a solid state image element or the like, a driving means therefor, a signal processing circuit and so on. In this case, the video camera 1 also includes an encoder which produces a composite color video signal of NTSC system. However, it is possible that such encoder is provided in the signal processing circuit system (at the next stage of, for example, D/A converter which will be described later) of the later stage of the video camera 1.

The composite color video signal from the video camera 1 is supplied through a gain change-over circuit 1a to an A/D converter 2 thereby digitized. A reference numeral 4 designates a clock signal generating/system control circuit which produces a clock signal and a control signal including various synchronizing signals and color framing and which controls the whole system. An oscillatory signal with the frequency of $6f_c$ from a reference oscillator 3A is supplied to frequency dividers 3a, 3b and 3c the frequency dividing ratios of which are respectively 1/6, ⅓ and ½ and thereby frequency-divided. The reference clock signals with the frequencies $f_c$, $2f_c$ and $3f_c$ are selected by a switch S (having fixed contacts a, b c and a movable contact d) and then supplied to the circuit 4. Also, the gain of the gain change-over circuit 1a is switched to in response to the switching of the switch S.

The previously proposed recording apparatus shown in FIG. 16 will be described. In this case, the rotary magnetic heads $H_A$ to $H_E$ shown in FIG. 1 or 15 are respectively replaced with pairs of rotary magnetic heads $H_{A2}$, $H_{A2}$; ~; $H_{E1}$, $H_{E2}$. In FIG. 16, like parts corresponding to those in FIG. 1 or 15 are marked with the same references and will not be described. In this example, there is used a video camera the scanning speed of which is 5M times, or 5, 10 and 15 times the scanning speed Sn of the standard television signal of the NTSC system, namely, the scanning speeds 5Sn, 10Sn and 15Sn of the multiple stages.

The frequency-modulated video signals from the frequency modulators MD - 1 to MD - 5 are respectively supplied through the amplifiers $A_1$ to $A_5$ to the five pairs of rotary magnetic heads $H_{A1}$, $H_{A2}$; $\sim$; $H_{E1}$, $H_{E2}$ simultaneously or selectively. On the magnetic tape are sequentially formed 5 adjoining slant tracks by the heads $H_{A1}$ to $H_{E1}$ and 5 slant tracks by the heads $H_{A2}$ to $H_{E2}$ alternately.

FIG. 17 shows the arrangement of the rotary magnetic heads $H_{A1}$, $H_{A2}$; $\sim$; $H_{E1}$, $H_{E2}$. The rotary magnetic heads $H_{A1}$, $H_{A2}$; $\sim$; $H_{E1}$, $H_{E2}$, the heads of each pair having an angular distance of 180° therebetween are respectively mounted on the rotary drum RD of the tape guide drum GD with an angular distance of 72° and rotated one revolution at each $2/Mf_V$, or 30M (Hz) in the clockwise direction in accordance with the value M/2. A tape to be recorded is wrapped around the tape guide drum GD along its external periphery from the point $P_2$ to the point $P_1$ in the counterclockwise direction. The tape wrapping angle is selected to be about 180° or above. The tape transport speed is selected to be 5M times the normal value vt of the normal transport.

The diameter of the tape guide drum GD is selected in such a manner that the relative speed between the head and the tape become equal to that of the case in which there are provided five rotary magnetic heads. And, if a tape to be recorded so as to have a track pattern which can be reproduced by a standard 2-head type VTR is formed and reproduced by the standard VTR at normal playback speed, the phenomenon moving at high speed can be reproduced in slow motion mode.

In this example, when the monitor playback rotary magnetic head is provided, it is possible to use a pair of rotary magnetic heads (movable head) having an angular spacing of 180° therebetween.

As set forth above, according to the above example, it is possible to obtain the recording apparatus for recording a video signal obtained from a high speed scanning video camera which can easily pick up and record the phenomenon moving at high speed by using the television camera and VTR.

According to the example shown in FIGS. 15 and 16, it is possible to obtain the recording apparatus which can easily pick up and record the phenomenon moving at high speed by using the television camera and VTR and which can record the phenomenon moving at high speed with an optimum recording frequency meeting the speed of the high speed moving phenomenon.

According to the example shown in FIG. 16, when 2N rotary magnetic heads are rotated at revolution number M/2 times the standard revolution number, the rotary magnetic heads can trace the magnetic tape with a contact larger angle than that provided when N rotary magnetic heads are rotated at a revolution number M times the standard revolution number. Thus, it is possible to widen the speed range of the playback to different speeds at which the stable picture can be reproduced.

By the way, in the VTR of the SMPTE type C, in case of the NTSC system, a video signal from the 15th line of a 1st field to the first half of the 4th line of a 2nd field is recorded on one slant track, while a video signal from the second half of the 14th line of the 2nd field to the 4th line of the 1st field is recorded on the adjacent one slant track. Between the video signals recorded on the adjacent slant tracks there is a phase deviation of 2.5 H (where H represents the horizontal period). Further, if the vertical blanking period of the video signal between the 1st and 2nd fields is taken as 1st to 20 th lines, in the first field, no video signal is recorded on the slant track during 10 line periods of the 5th line to the 14th line of the vertical blanking period in the first field, while no video signal is recorded on the slant track during 10 line periods of the second half of the 4th line to the first half of the 14th line of the vertical blanking period in the second field.

Generally with the VTR, when the magnetic tape on which the video signal is recorded is reproduced at a tape speed different from that upon recording, the rotary magnetic head traces slantwise the slant tracks formed in parallel to each other. If the magnetic tape on which the video signal is recorded is reproduced in slow to still modes or in reverse playback mode in such a manner that the rotation direction of the rotary magnetic head is made opposite to the transport direction of the magnetic tape, the frequency of the reproduced video signal is lowered as compared with that of the video signal upon recording mode, namely, the video signal is expanded in time so that the period during which the video signal is not reproduced is widened over 10 lines. This will be described with reference to FIG. 18.

In FIG. 18, the abscissa X—X' indicates the tape transport speed (where the normal tape speed is taken as 1), while the ordinate Y—Y' indicates the relative phase (where 2.5 H is taken as 1) of the video signal reproduced from the magnetic tape on which the video signal is recorded by the high speed scanning video camera. The case where the magnetic tape is transported at tape speed 5 times the normal tape speed and then a video signal is recorded, while the magnetic tape is transported at tape speed lower than the normal tape speed and then reproduced will be explained by way of example.

A straight line $O$-$x_0$ in FIG. 18 indicates a relation between a point in which upon reproducing the rotary magnetic head is in a position with the just tracking state at the beginning of a slant track, traces the slant track with dynamic tracking and at last no reproduced output is produced therefrom and the tape transport speed. In other words, the bent lines $x_0$-$O$-$X'$ and $X$-$O$-$x'_0$ respectively indicate the expanded time and compressed time of the reproduced video signal at each tape transport speed.

Moreover, in the ordinary dynamic tracking system, the respective regions of the bent lines $x_0$-$O$-$X'$ and $x'_0$-$O$-$X$ are converted to the respective regions shown by the bent lines $A_1$-$O$-$B_1$ and $A_2$-$O$-$B_2$ thereby being made symmetrical each other with respect to the abscissa $X'$—$X$. Then, the straight lines $O$-$B_1$ and $O$-$A_1$ respectively become the center of designing the beginning and end portions at which the rotary magnetic head starts to or ceases to contact with the slant track of the magnetic tape. The region of the bent line $A_1$-$O$-$B_1$ becomes the region in which the video signal can not be reproduced.

Straight lines $V_1$—$V'$ and $V_2$—$V'_2$ parallel to the abscissa X—X' respectively indicate the limit at which the vertical blanking period of the video signal can be reproduced, while straight lines $V_3$—$V'_3$ and $V_4$—$V'_4$ parallel to the abscissa X—X' respectively indicate the end and beginning of the video period of the video signal.

When upon playback at tape transport speed different from that upon recording an ideal jump processing is performed, considering that the rotation phase of the capstan is continuous and that the jump processing condition for maintaining the tracking is some integer times the one pitch (=2.5 H), the rotary magnetic head for performing the dynamic tracking ceases to contact with the magnetic tape in the region between the straight lines $a_1$—$a'_1$ and $a_2$—$a'_2$, while it starts to contact with the magnetic tape in the region between the straight lines $b_1$—$b'_1$ and $b_2$—$b'_2$.

Accordingly, after the ordinary signal processing is performed and the SMPTE type C format is followed, when the video signal recorded on the magnetic tape at tape speed 5 times the normal tape speed is reproduced at tape speed about 3.6 times the normal tape speed, it becomes difficult to reproduce the end portion of the vertical blanking period of the video signal. When such video signal is reproduced at tape speed about 2.8 times the normal tape speed, the end portion of the video period of the video signal begins to be dropped.

From the above considerations, it is understood that the magnetic tape on which the video signal is recorded at tape speed 5 times the normal tape speed can not be reproduced at tape speed about 3.6 times or below the normal tape speed. In this connection, in the case of the magnetic tape on which the video signal is recorded at tape speed 3 times the normal tape speed, this magnetic tape can not be reproduced at tape speed about 1.6 times or below the normal tape speed.

OBJECT AND SUMMARY OF THE INVENTION

Accordingly, it is an object of the present invention to provide an improved recording and reproducing apparatus for recording and reproducing a video signal obtained from a high speed scanning video camera.

It is another object of the present invention to provide a recording and reproducing apparatus for recording and reproducing a video signal obtained from a high speed scanning video camera which can easily pick up, record and reproduce a phenomenon moving at high speed by using a television camera and a VTR.

It is still another object of the present invention to provide a recording and reproducing apparatus for recording and reproducing a video signal obtained from a high speed scanning video camera which is compatible with the VTR of a standard type or C-format of the SMPTE.

It is a further object of the present invention to provide a recording and reproducing apparatus for recording and reproducing a video signal obtained from a high speed scanning video camera which can record a video signal obtained from a high speed scanning video camera so as to be reproduced at tape speed sufficiently lower than the normal tape speed without causing the vertical synchronizing disorder and the drop of the picture.

It is a still further object of the present invention to provide a recording and reproducing apparatus for recording and reproducing a video signal obtained from a high speed scanning video signal which can record such video signal on the magnetic tape with the standard recording pattern and which can reproduce the same at tape speed sufficiently lower than the normal tape speed.

According to one aspect of the present invention, there is provided a recording and reproducing apparatus for recording and reproducing a video signal obtained from a high speed scanning video camera which comprises a video camera the field and line scanning speeds of which are respectively N(N is a natural number of 2 or above) times the field and line scanning speeds Ssn and Sln of a standard television signal, memory means supplied with the video signal from the video camera and frequency converting means for converting the line scanning speed of the video signals of N channels read out parallel from the above memory means to (1+k/the number of scanning lines where k is a natural number) times wherein the video signals of N channels of field and line scanning speeds Ssn and (1+k/the number of scanning lines) Sln are supplied to N rotary magnetic heads rotating at the standard revolution number so as to be recorded on a magnetic tape being transported at tape speed N times the standard tape speed to form the slant tracks.

According to another aspect of the present invention, there is provided a recording and reproducing apparatus for recording and reproducing a video signal obtained from a high speed scanning video camera which comprises a video camera the field and line scanning speeds of which are respectively N (N is a natural number of 2 or above) times the field and line scanning speeds Ssn and Sln of a standard television signal, memory means supplied with the video signals from the video camera and frequency converting means for converting the line scanning speed of the video signals of N channels read out parallel from the above memory means to (1+k/the number of scanning lines)(where k is a natural number) times wherein the video signals of N channels of field and line scanning speeds Ssn and (1+k/the number of scanning lines)Sln are supplied to N rotary magnetic heads rotating at the standard revolution number so as to be recorded on a magnetic tape being transported at tape speed N times the standard tape speed to form slant tracks and in which a diameter D' of a tape guide drum having N rotary magnetic heads mounted thereon is selected to satisfy the following equation $$D' = Dc\{h^2 + (L\cos\theta c - N\,vt)^2\}^{\frac{1}{2}} \times \{h^2 + (L\cos\theta cvt)^2\}^{-\frac{1}{2}} \times (1 + k/\text{the number of scanning lines})$$

in which Dc is the diameter of the standard tape guide drum, h the height of the track, L the track length, $\theta c$ the track angle and vt the standard tape transport speed.

As described above, according to the present invention, it is possible to obtain a recording and reproducing apparatus for recording and reproducing a video signal obtained from a high speed scanning video camera which can record a video signal obtained from a high speed scanning video camera on a magnetic tape such that the tape can be reproduced at tape speed sufficiently lower than the normal tape speed without causing the vertical synchronizing disorder and the drop of the picture.

Furthermore, according to the present invention, it is possible to obtain a recording and reproducing apparatus for recording and reproducing a video signal obtained from a high speed scanning video signal which can record such video signal on a magnetic tape with the standard recording pattern and which can reproduce the same at tape speed sufficiently lower than the normal tape speed.

The other objects, features and advantages of the present invention will become apparent from the following description taken in conjunction with the accompanying drawings through which the like references designate the same elements and parts.

BRIEF DESCRIPTION OF THE DRAWINGS

FIG. 2 is a timing chart of write and read timings of a memory useful for explaining the operation of the recording apparatus shown in FIG. 1;

FIG. 8 is a timing chart of write and read timings of a memory useful for explaining the recording apparatus shown in FIG. 7;

DESCRIPTION OF THE PREFERRED EMBODIMENT

Figure 18:
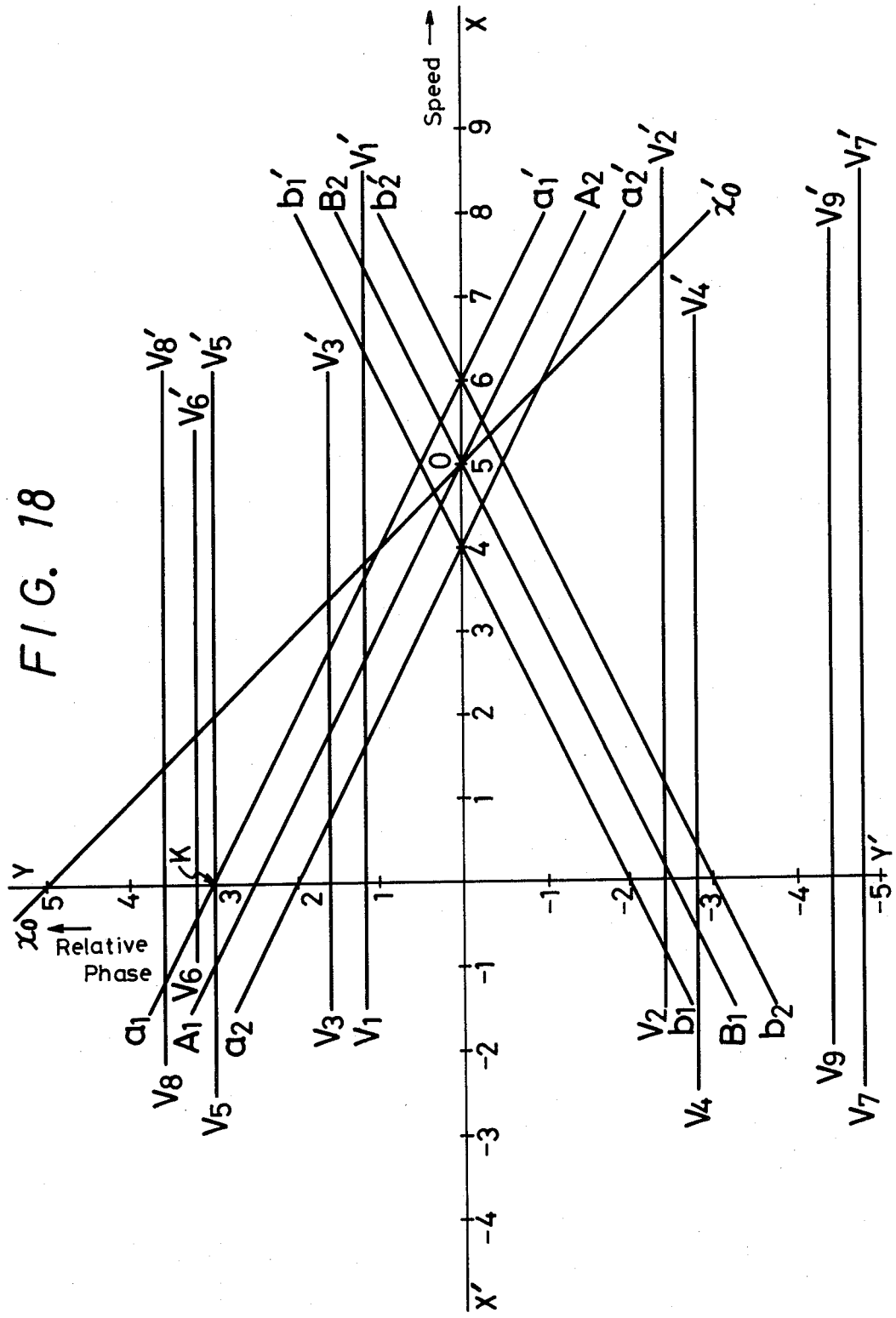
FIG. 18 is a diagram used to explain the present invention, in which, upon recording, a magnetic tape is transported at tape speed 5 times the normal tape speed and is reproduced at tape speed lower than the normal tape speed.

An embodiment of the present invention will hereinafter be described with reference to the attached drawings. At first, such a case where a magnetic tape on which a video signal is recorded at tape speed, for example, five times the normal tape speed is reproduced will be explained. Also, let it be considered that such magnetic tape can be reproduced at tape speed, for example, up to 0 times (still mode) the normal tape speed. In this case, it is necessary that in FIG. 18 the playback limit of the vertical blanking period of the video signal $V_1$—$V'_1$ (playback limit of the end side of the picture screen) is shifted above a straight line $V_5$—$V'_5$ which passes through an intersecting point K between the ordinate Y—Y' and the straight line $a_1$—$a'_1$ and which is parallel to the abscissa X—X'. Similarly, in the beginning side of the picture screen, the straight lines $b_2$—$b'_2$ and $V_4$—$V'_4$ are quite close to each other so that there is no extra region.

Therefore, if the straight line $V_1$—$V'_1$ is moved upward by the relative phase 2 to be a straight line $V_6$—$V'_6$ and the straight line $V_4$—$V'_4$ is moved downward by the relative phase 2 to be a straight line $V_7$—$V'_7$, the length of the slant track is increased by the relative phase 4, namely, 10 H. In other words, the vertical blanking period becomes long by 10 H. Accordingly, the straight line $V_3$—$V'_3$ is moved upward by the relative phase 2 to be a straight line $V_8$—$V_8'$, while the straight line $V_2$—$V'_2$ is moved downward by the relative phase 2 to be a straight line $V_9$—$V'_9$.

Figure 1:
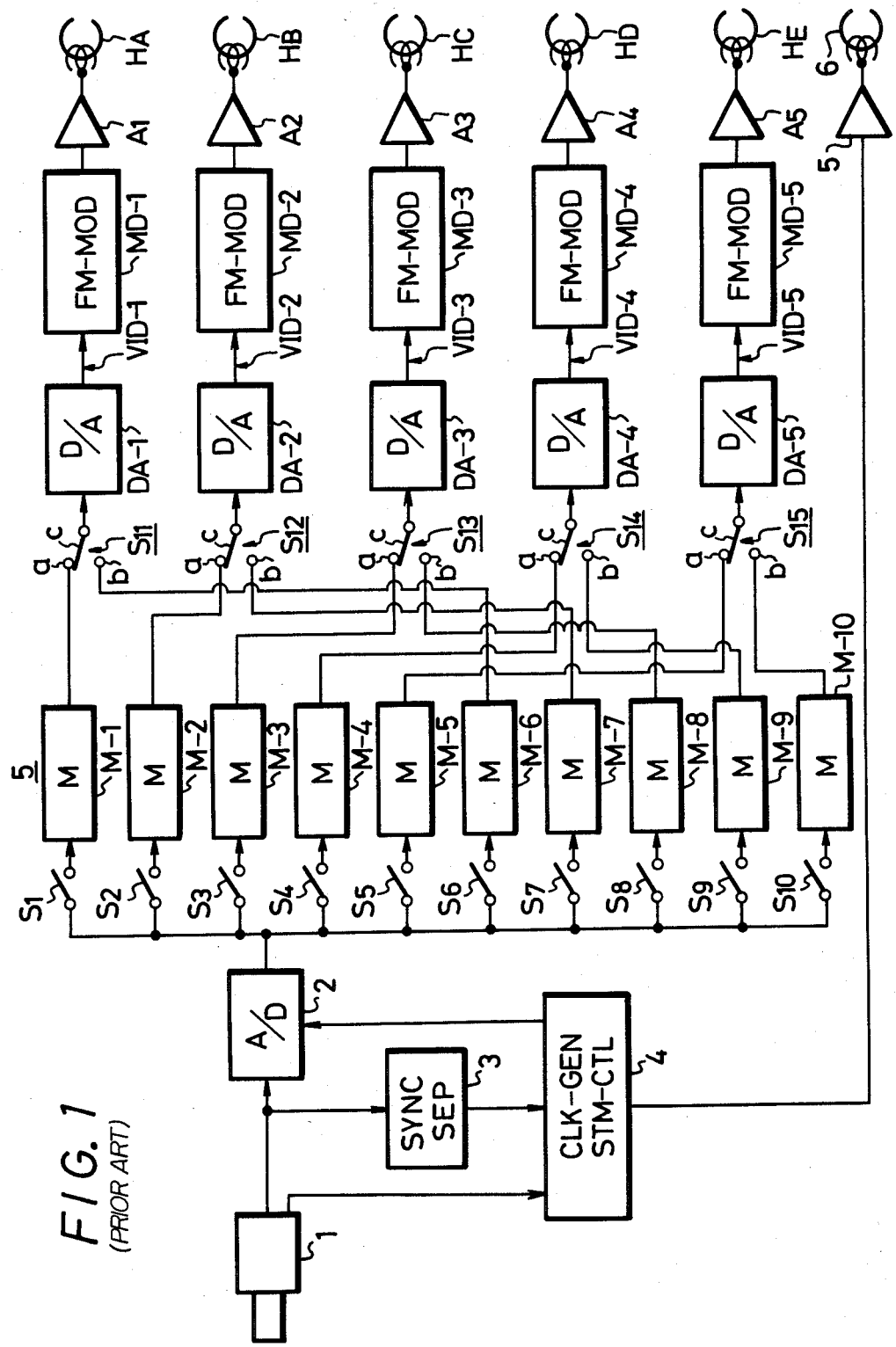
FIG. 1 is a block diagram showing a previously proposed recording apparatus for recording a video signal obtained from a high speed scanning video camera.
Figure 3A:
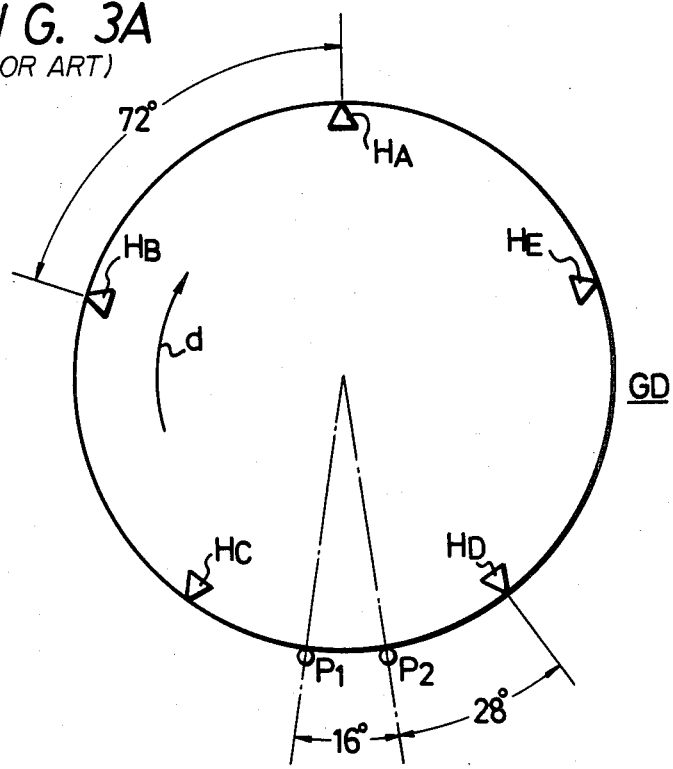
FIGS. 3A and 3B are respectively plan and side views illustrating a tape guide drum used in the recording apparatus shown in FIG. 1.
Figure 3B:
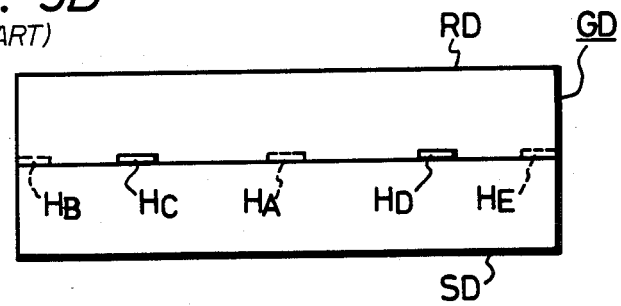
Figure 19:
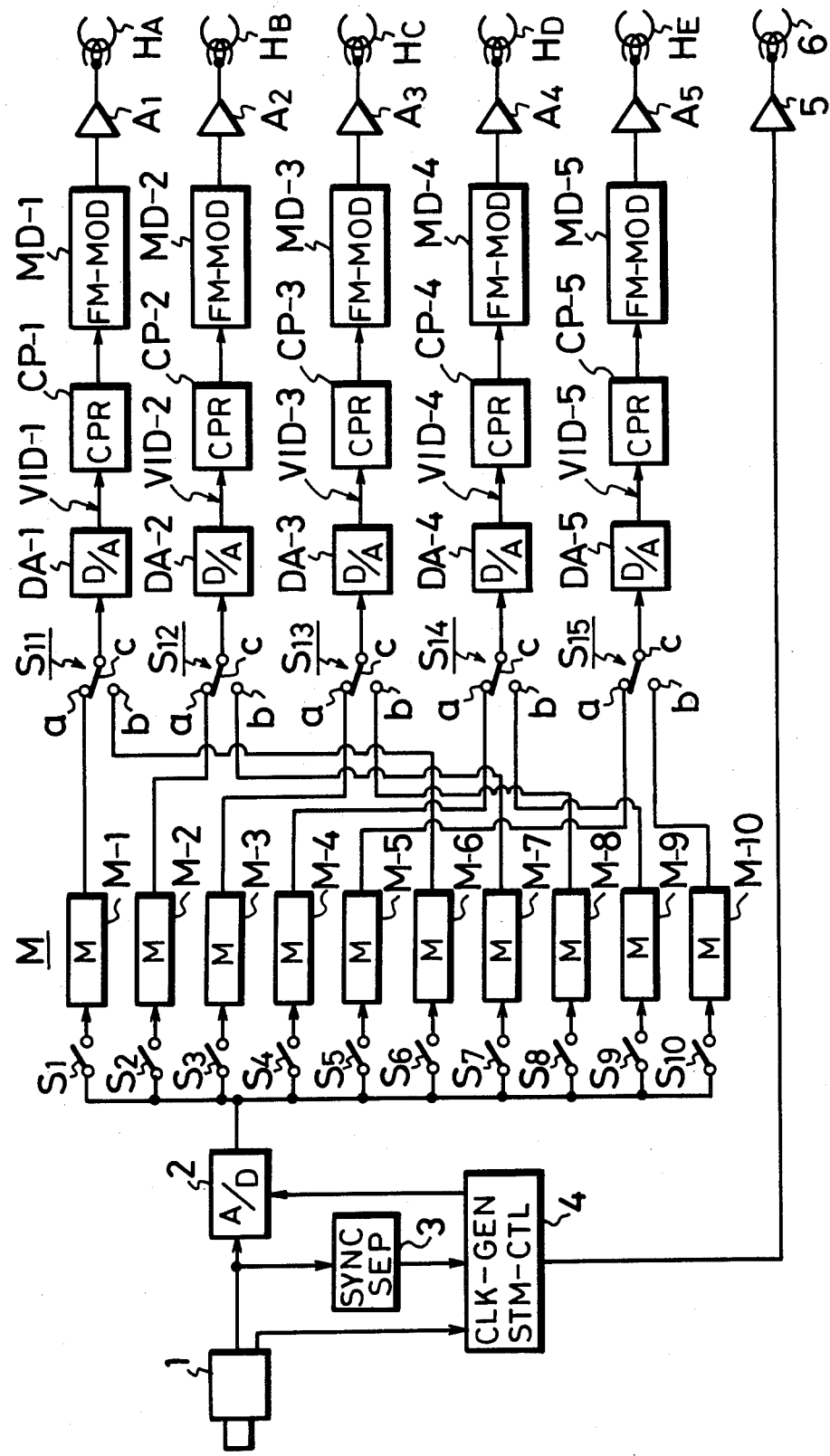
FIG. 19 is a block diagram showing an embodiment of the recording and reproducing apparatus for recording and reproducing a video signal obtained from a high speed scanning video camera according to the present invention.

Now, an embodiment of the recording and reproducing apparatus for recording and reproducing a video signal obtained from a high speed scanning video camera will be described with reference to FIG. 19. In FIG. 19, like parts corresponding to those in FIG. 1 are marked with the same references and will not be described in detail. In this embodiment, compressors CP-1 to CP-5 are respectively connected between the D/A converters DA-1 to DA-5 and the frequency modulators MD-1 to MD-5 as frequency converting means. By these compressors CP-1 to CP-5, only the line scanning speed, namely, the horizontal frequencies of the analog video signals VID-1 to VID-5 from the D/A converters DA-1 to DA-5 are respectively compressed to $(1+20/525)$ times. Accordingly, if the sub-carrier frequency, the horizontal frequency, the vertical frequency and the frame frequency of the video signals (NTSC system) developed at the output side of the compressors CP-1 to CP-5 are respectively taken as $(f_{SC})$, $(f_H)$, $f_V$ and $f_{FR}$, they will respectively be expressed as $$(f_{SC}) = \frac{910}{4} f_H = 3.72 \text{ (MHz)}$$

$$(f_H) = \frac{525}{2}\left(1 + \frac{20}{525}\right) f_V = 16.35 \text{ (kHz)}$$

$$f_V = 60 \text{ (Hz)}$$

$$f_{FR} = 30 \text{ (Hz)}$$

Moreover, the carrier frequency of the frequency modulators MD-1 to MD-5 is selected to be $5(1+20/525)$ times the standard value. Furthermore, the rotary magnetic heads $H_A$ to $H_E$ are rotated at the standard revolution number and the magnetic tape (not shown) is transported at tape speed 5 times the standard tape speed.

Thus, the vertical blanking period of the video signal in each field recorded on the magnetic tape so as to form the slant track is made long by 10 H amount.

In this case, instead of providing the above compressors CP-1 to CP-5, it is possible that the horizontal frequency of the video camera is selected to be $5(1+20/525)$ times the reference frequency $f_H$. Alternatively, it is also possible that the read frequency of the field memories M - 1 to M - 5 is selected to be equal to $1/5(1+20/525)f_{W \cdot CK}$.

Figure 20:
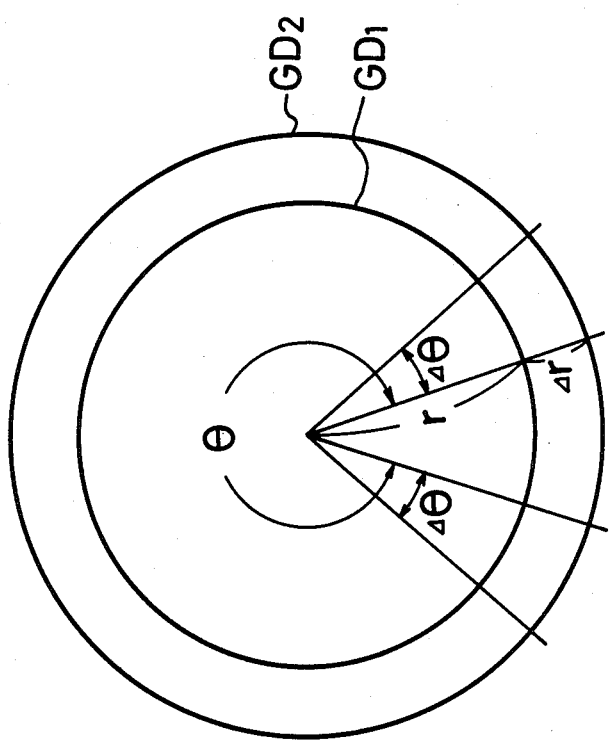
FIGS. 20 and 21 are respectively a diagram and a vector diagram useful for explaining the apparatus of the invention shown in FIG. 19.

In order to obtain the magnetic tape having the track pattern suitable for the format of the SMPTE type C VTR, it is necessary that the diameter D of the above tape guide drum is increased to be D'. This will be described next. In FIG. 20, reference character $GD_1$ designates a tape guide drum having the diameter D and $GD_2$ designates a tape guide drum having the diameter D'. Also let it be assumed that D is 2r and D' is $2(r+\Delta r)$ where r is the radius of the tape guide drum $GD_1$. $\theta$ designates a standard tape wrapping angle ($=344°$) with which the tape is wrapped around the tape guide drum $GD_1$. In addition, the revolution number of each rotation drum of the tape guide drums $GD_1$ and $GD_2$ is selected same with each other. Although $r\theta$ is a standard track length (format of the SMPTE type C VTR) formed by the rotary magnetic head of the tape guide drum $GD_1$, since the horizontal scanning speed of the video signal to be recorded is compressed to $(1+20/525)$, the track length becomes short as $r(\theta - 2\Delta\theta)$. Therefore, the track length is made equal to the standard track length $r\theta$ by increasing the diameter of the tape guide drum from D to D'. This will be expressed by the equation as $$r\theta = (r+\Delta r)(\theta - 2\Delta\theta)$$

or $\Delta\theta(r+\Delta r)$ becomes equal to 2p, in which p represents the length corresponding to 2.5 H. From the above equation, D'/D, namely, $(r+\Delta r)/r$ is given by the following equation.

$$(r + \Delta r)/r = \theta/(\theta - 2\Delta\theta)$$
$$= 1/(1 - 2\Delta\theta/\theta)$$
$$\approx 1 + 2\Delta\theta/\theta \text{ (where } 2\Delta\theta << \theta)$$
$$= 1 + \frac{20}{525}$$

Consequently, the diameter D' of the tape guide drum $GD_2$ is selected as $$D' = D_C \{h^2 + (L\cos\theta_C - 5vt)^2\}^{\frac{1}{2}} \times \{h^2 + (L\cos\theta_C - vt)^2\}^{\frac{1}{2}} \times \left(1 + \frac{20}{\text{the number of scanning lines}}\right)$$

where $D_C$ is the diameter of the standard tape guide drum, h the height of the track, L the track length, $\theta_C$ the track angle and vt the standard tape transport speed.

Thus, the duration during which the rotary magnetic head of the tape guide drum $GD_2$ contacts with the magnetic tape is made long by 10 H amount for each revolution of the rotary drum. Then, if 10 H amount is assigned to the front portion and rear portion of the slant track by 5 H each and the recording signal is gated out on the basis thereof, it is possible to obtain the recorded tape having the track pattern applicable to the standard of the SMPTE type C format.

Figure 4:
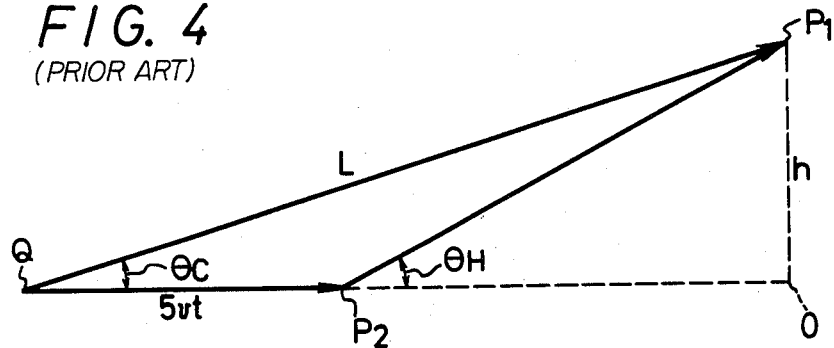
FIGS. 4 and 5 are respectively vector diagrams useful for explaining the recording apparatus shown in FIG. 1.
Figure 5:
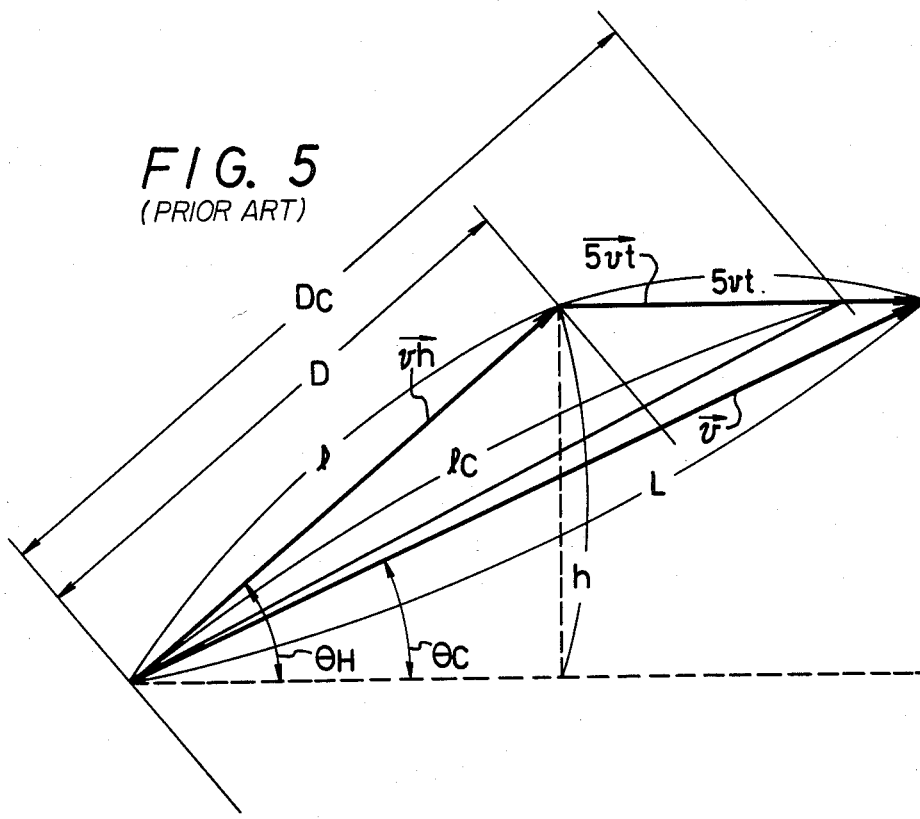
Figure 6:
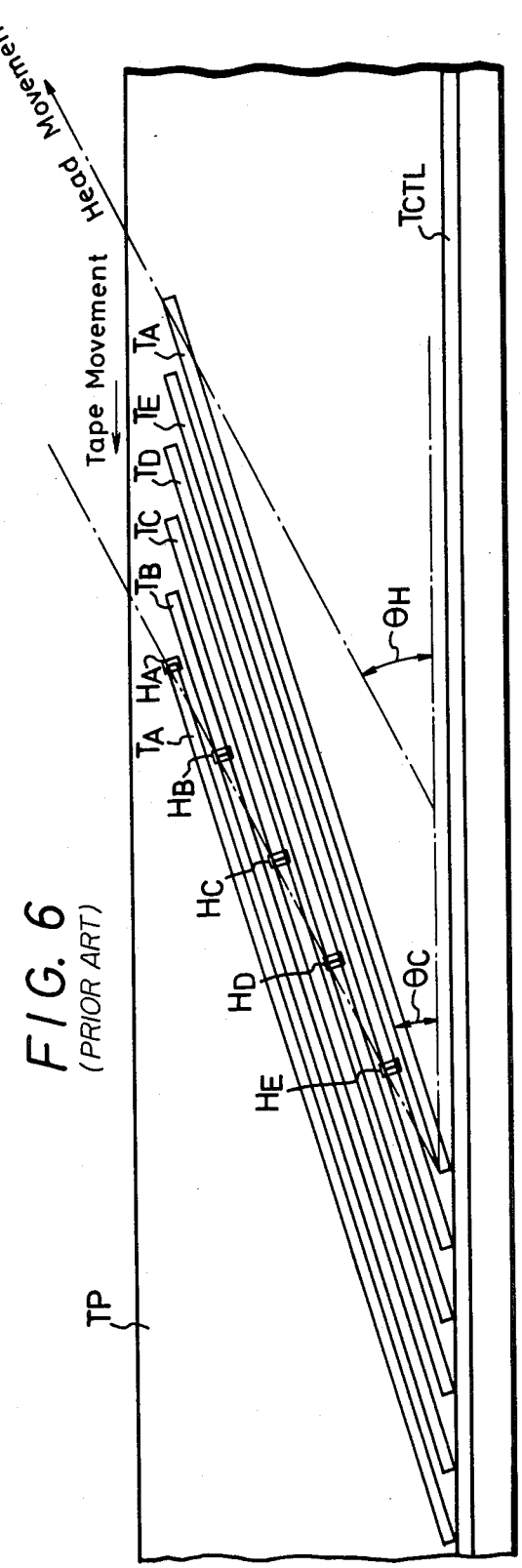
FIG. 6 is a diagram of a recorded pattern on a tape useful for explaining the recording apparatus shown in FIG. 1.
Figure 7:
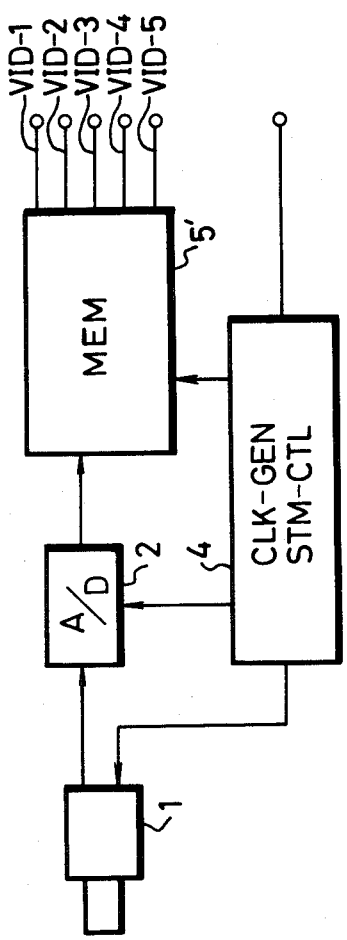
FIG. 7 is a block diagram showing a main part of another example of the previously proposed recording apparatus.
Figure 9A:
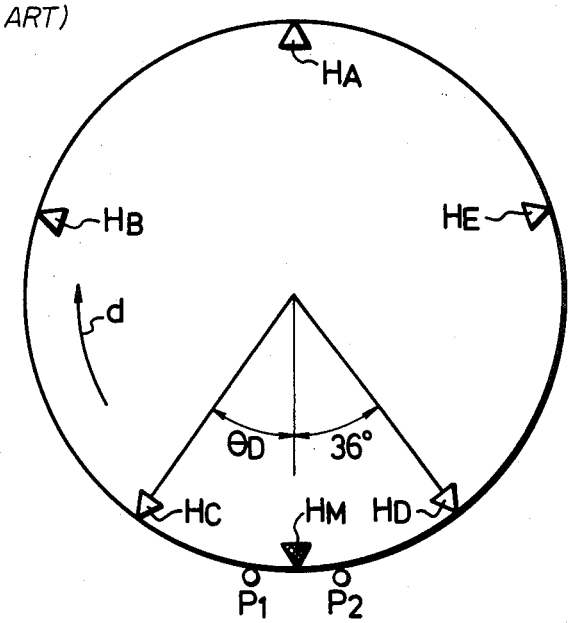
FIGS. 9A and 9B are respectively plan and side views of the tape guide drum used in the recording apparatus shown in FIGS. 1 or 7 when a rotary magnetic head for monitor playback use is provided.
Figure 9B:
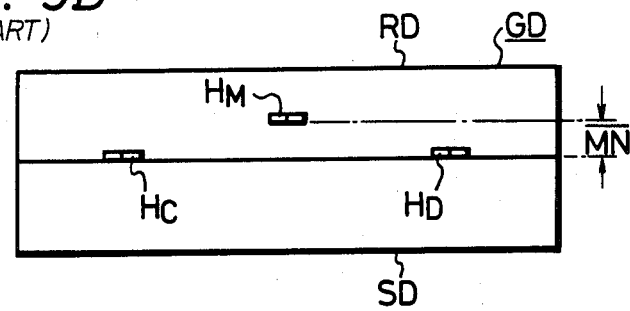
Figure 10:
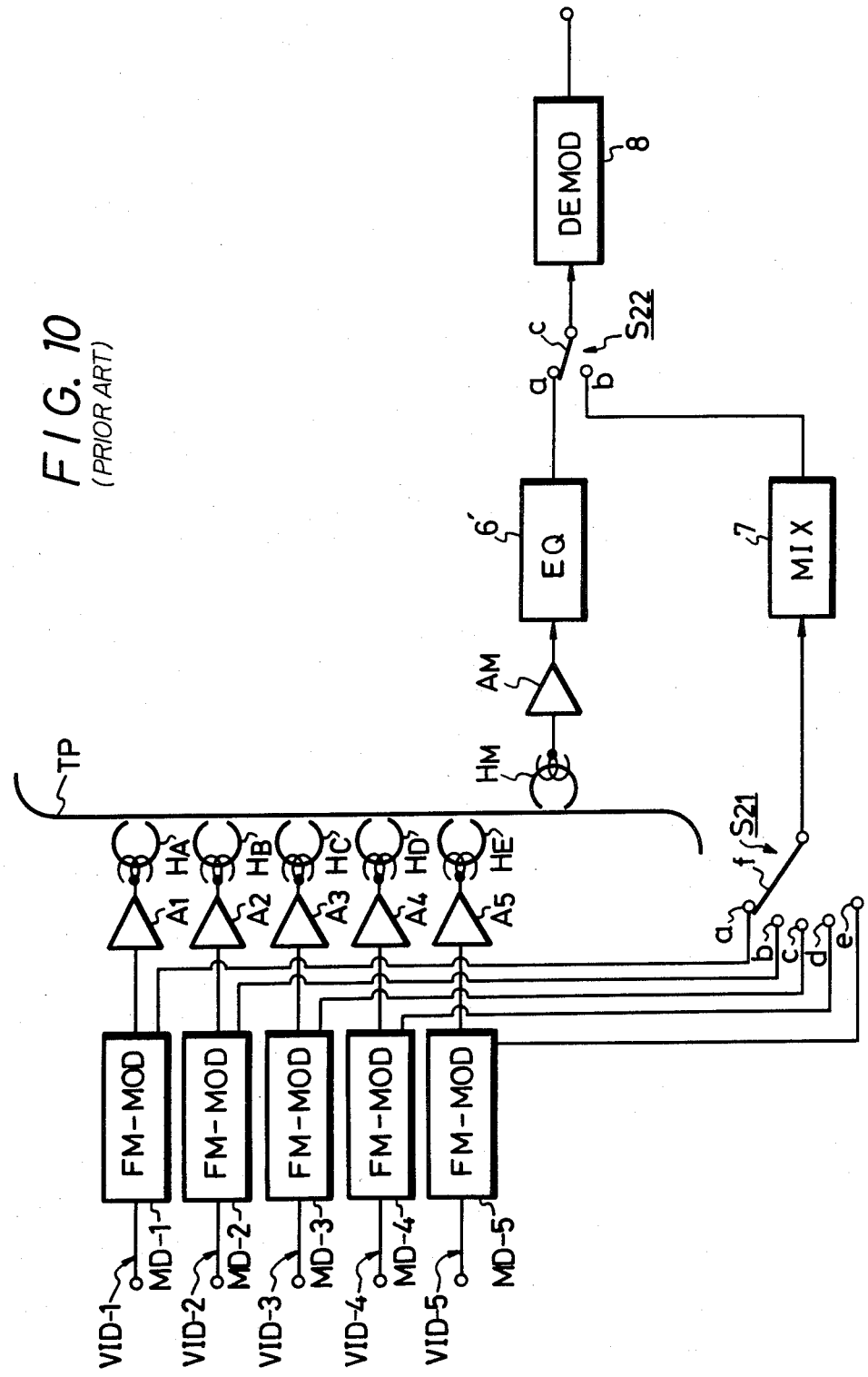
FIG. 10 is a block diagram showing an example of a detecting and adjusting apparatus used in the recording apparatus shown in FIGS. 1 or 7.
Figure 11:
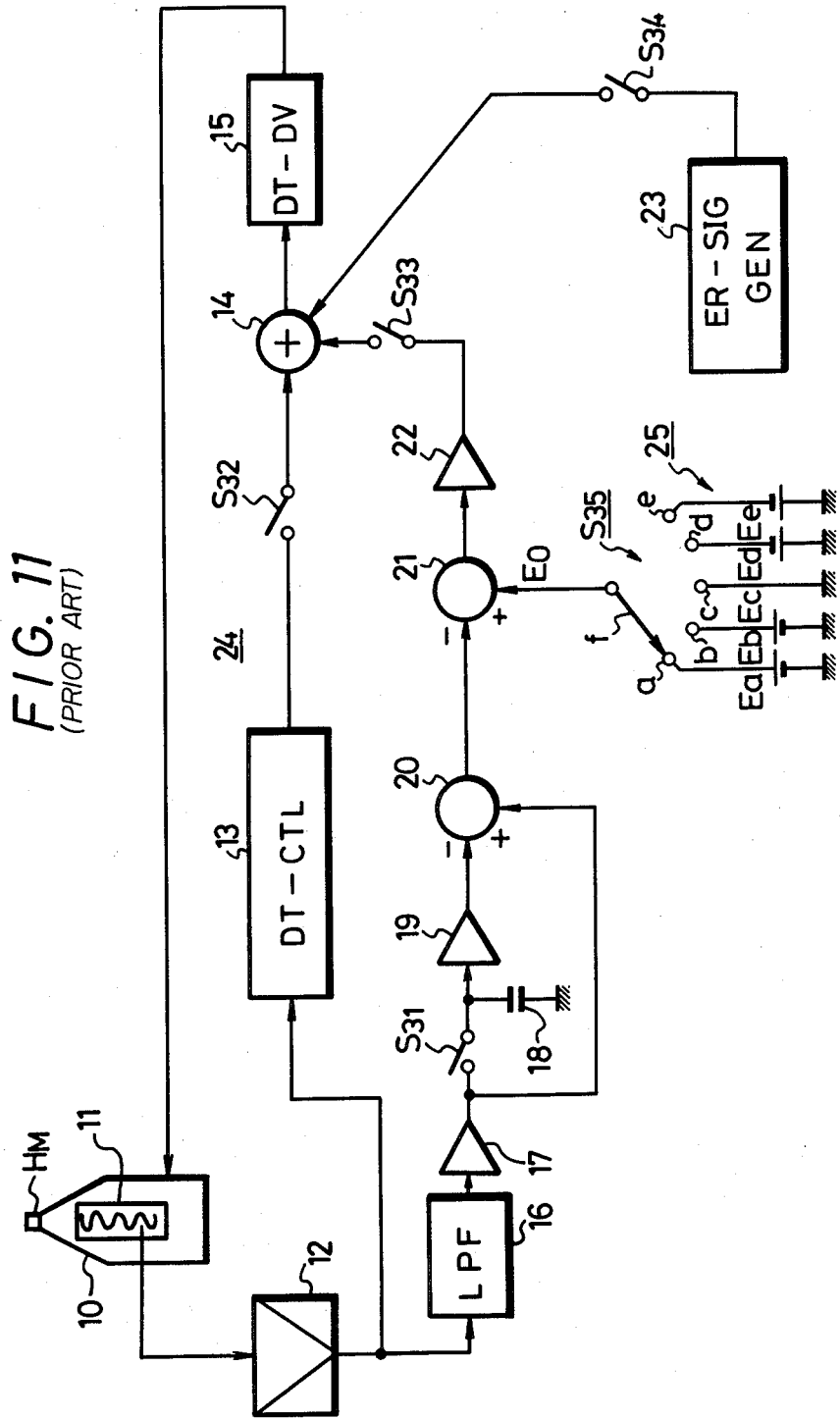
FIG. 11 is a connection diagram showing a bias driving circuit used for the monitor playback rotary magnetic head in the recording apparatus shown in FIGS. 9 and 10.
Figure 12:
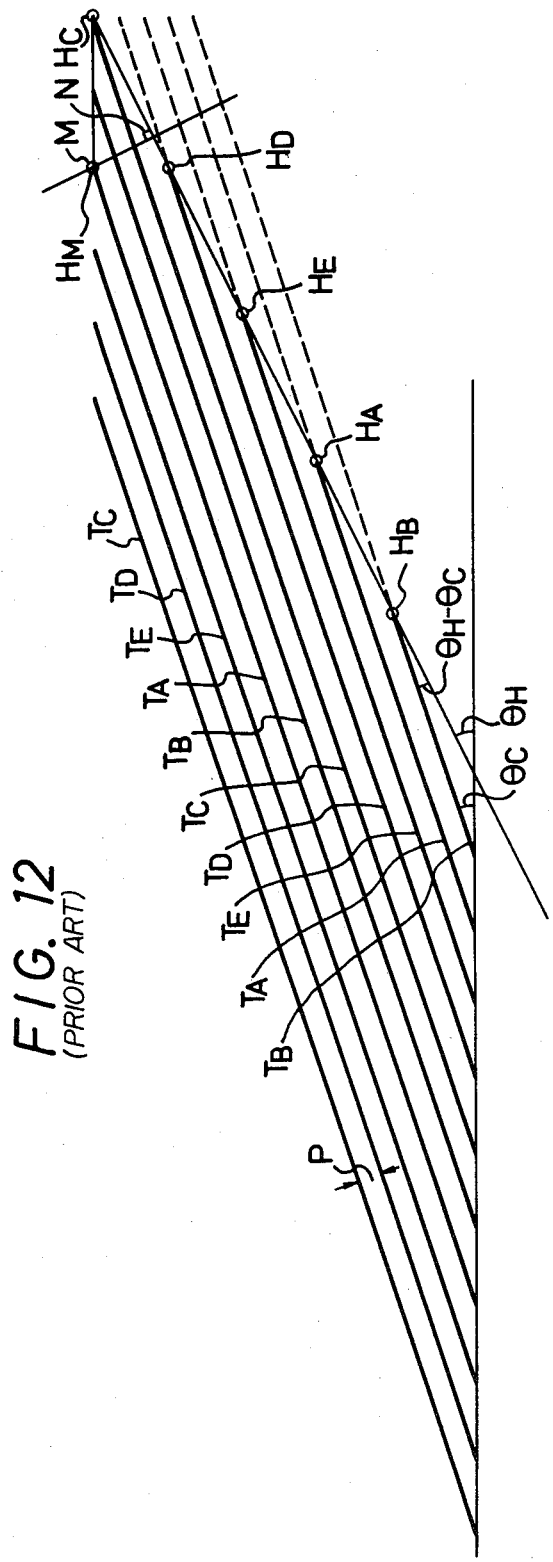
FIG. 12 is a diagram showing a positional relation between the tracks on the tape and the rotary magnetic head useful for explaining the operation of the bias driving circuit shown in FIG. 11.
Figure 13:
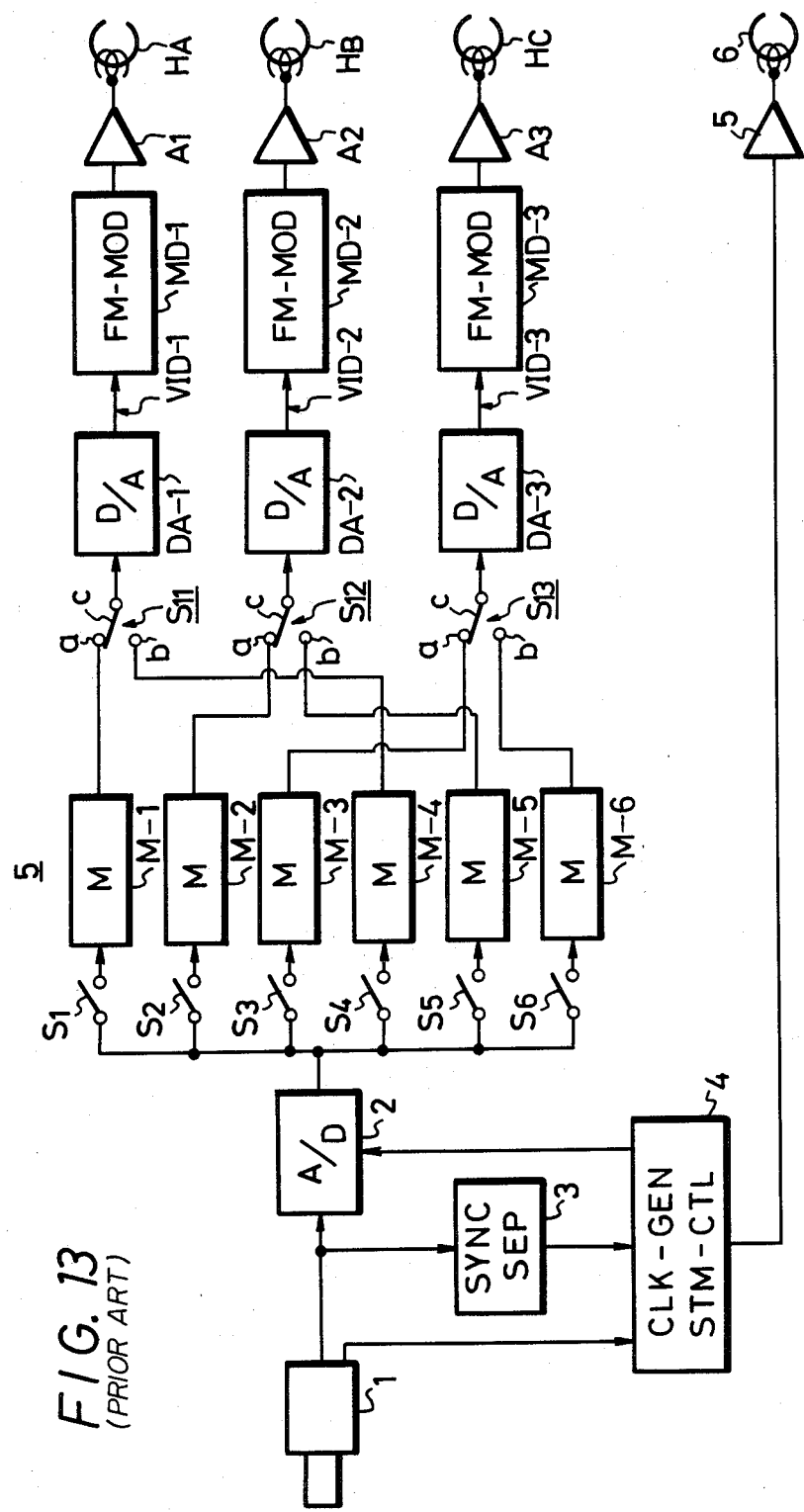
FIG. 13 is a block diagram showing other example of the previously proposed recording apparatus for recording a video signal obtained from a high speed scanning video camera.
Figure 14:
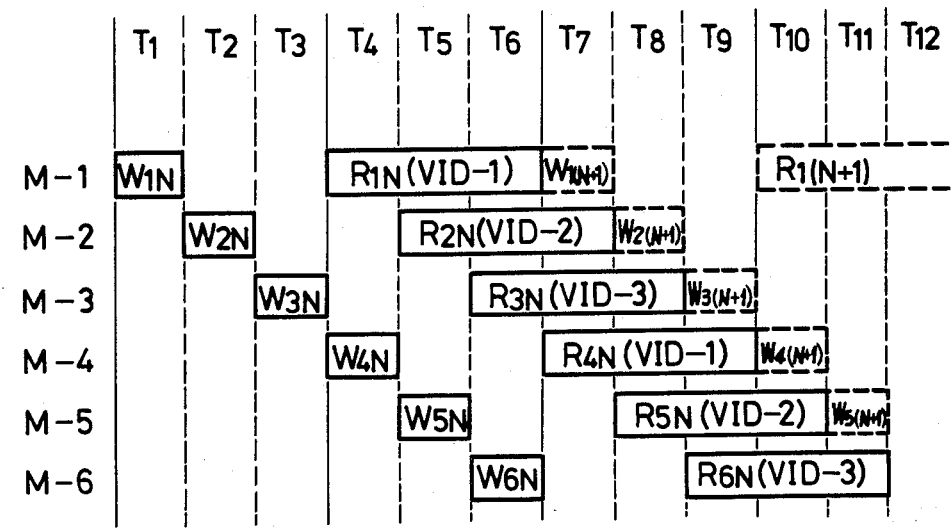
FIG. 14 is a timing chart of write and read timings of a memory useful for explaining the recording apparatus shown in FIG. 13.
Figure 17:
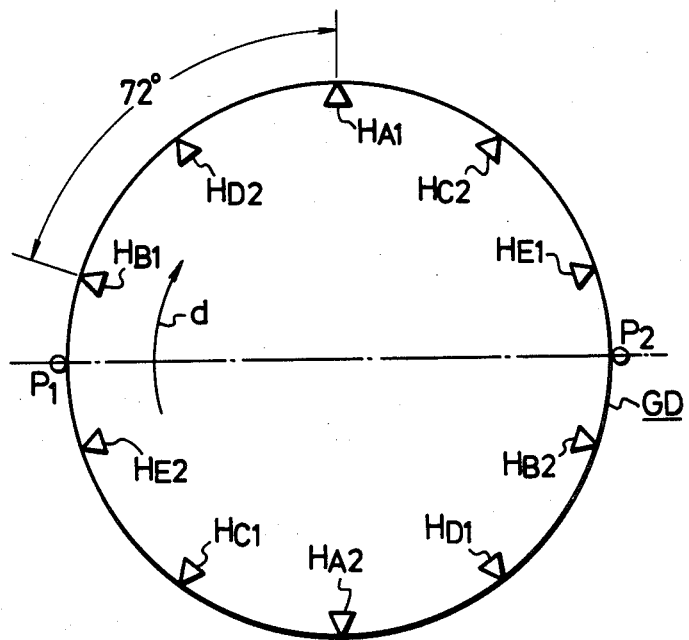
FIG. 17 is a plan view illustrating the tape guide drum used in the apparatus shown in FIG. 16.
Figure 15:
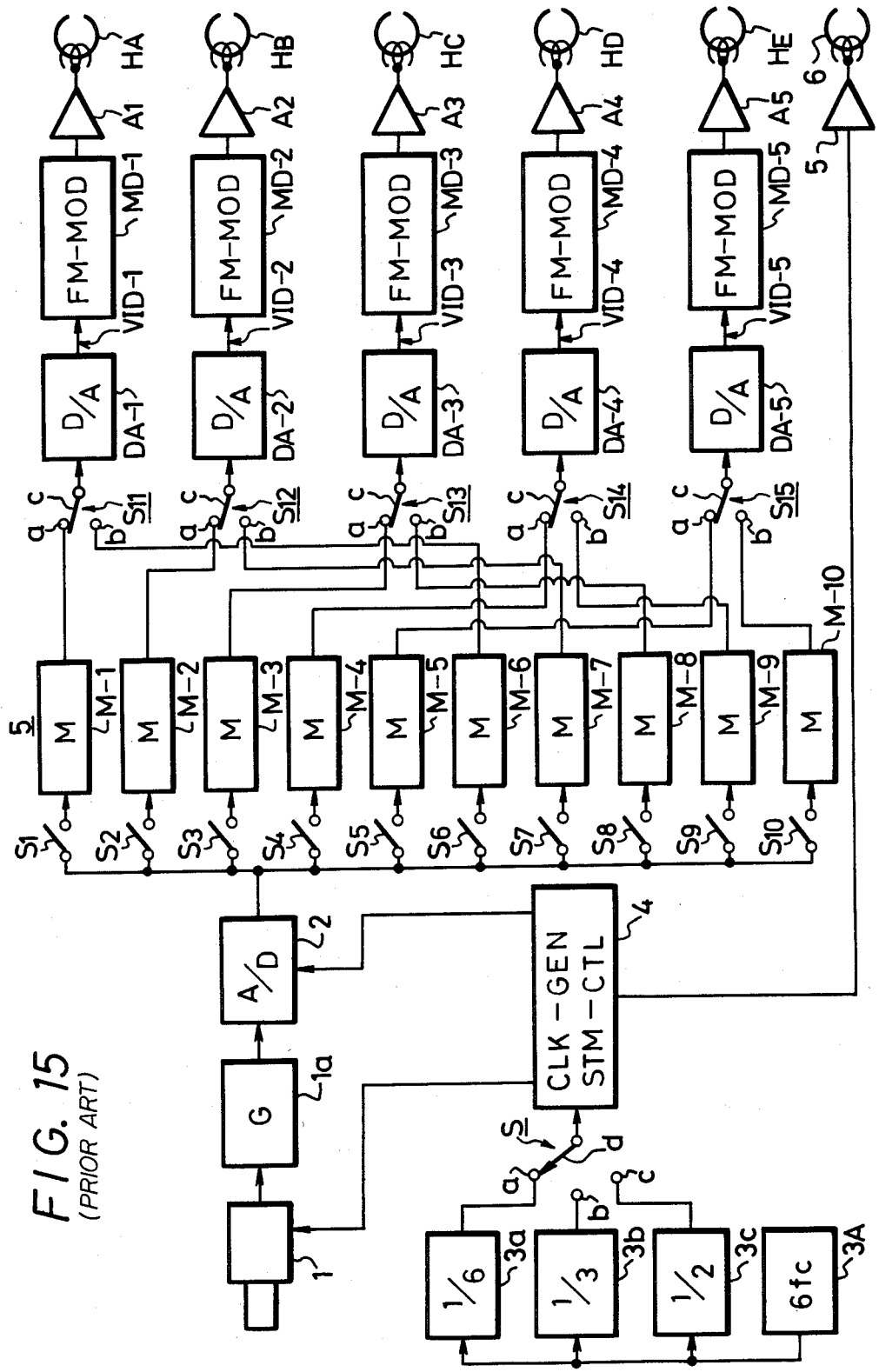
FIGS. 15 and 16 are respectively block diagrams showing further examples of the previously proposed recording apparatus for recording a video signal obtained from a high speed scanning video camera.
Figure 16:
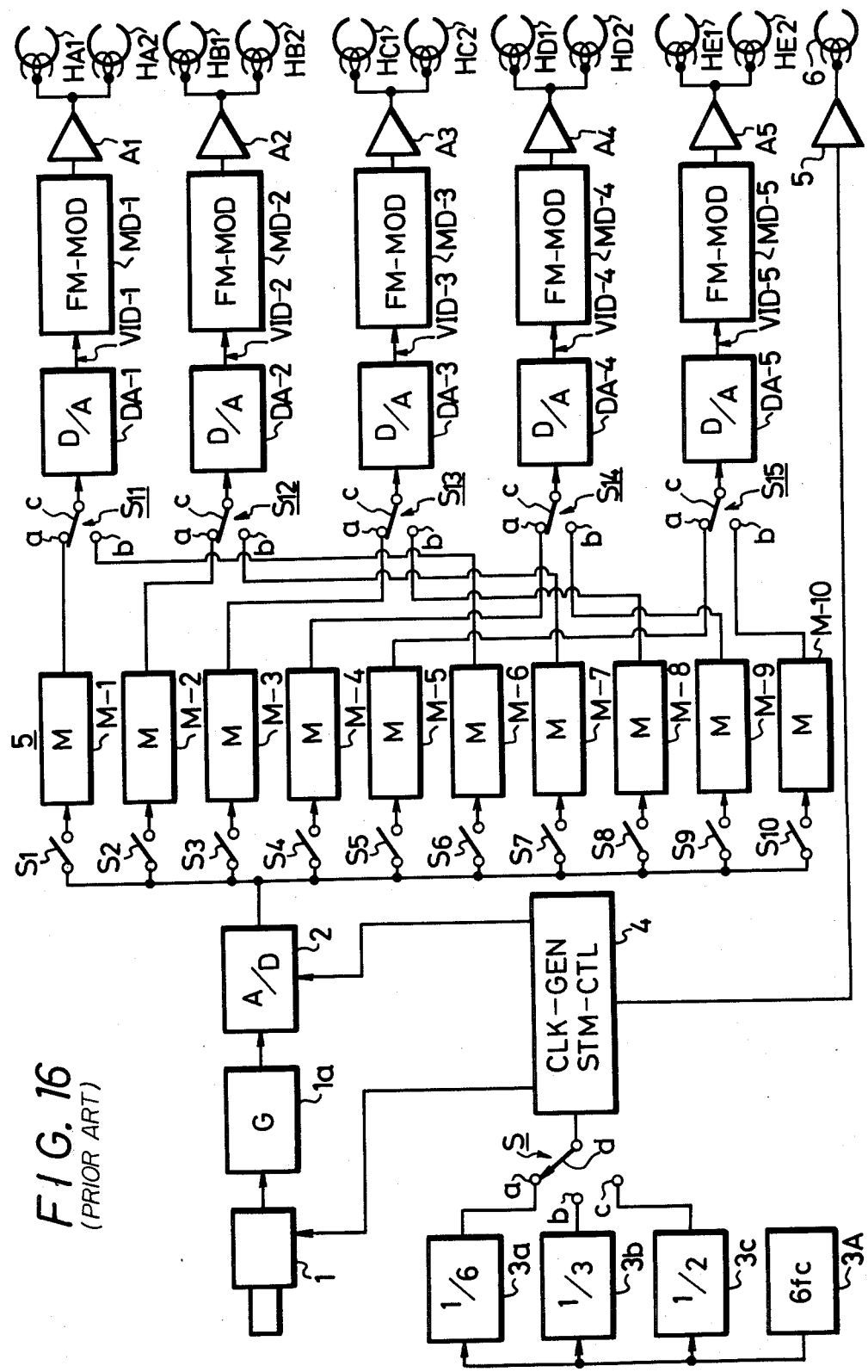
Figure 21:
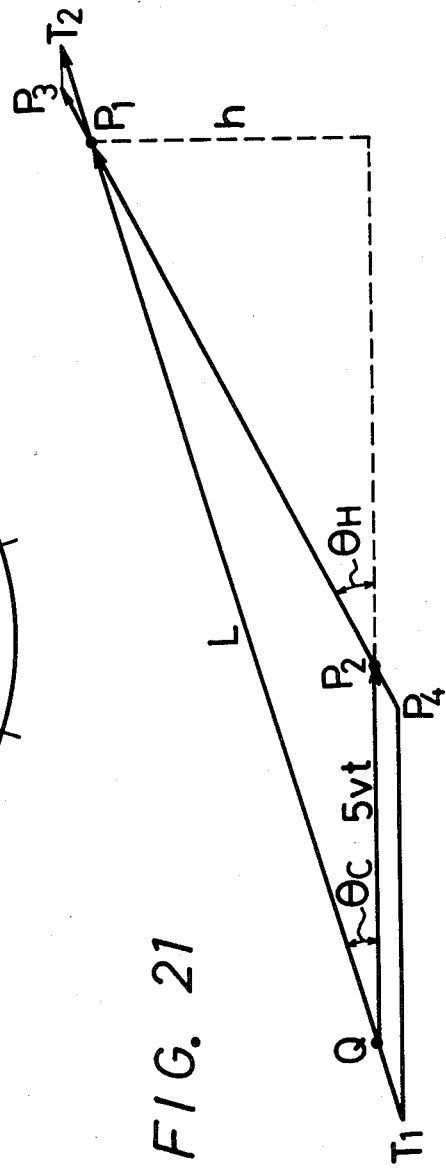

Subsequently, the relation among respective vectors of the track pattern, the tape running and the rotation of the drum of the recording and reproducing apparatus for recording and reproducing a video signal obtained from a high speed scanning video camera according to the present invention will be described with reference to FIG. 21. In FIG. 21, like portions corresponding to those in FIG. 4 are marked with the same references and will not be described in detail. That is, the track pattern vector is changed from $\overrightarrow{QP_1}$ to $\overrightarrow{T_1T_2}$, the tape running vector is changed from $\overrightarrow{QP_2}$ to $\overrightarrow{T_1P_4}$ and the drum rotation vector is changed from $\overrightarrow{P_2P_1}$ to $\overrightarrow{P_4P_3}$, respectively.

In the recording and reproducing apparatus for recording and reproducing a video signal obtained from a high speed scanning video camera according to the present invention in which a color video signal is obtained from a video camera the field and line scanning speed of which are respectively N (which is natural number of 2 or above) times the field and line scanning speeds S sn and Sln of the NTSC system standard television signal as a component signal and is supplied to memory means, the line scanning speed of N channel video signals read out in parallel to one other from the memory means is made (1+k/the number of scanning lines where k is a natural number) to provide the component signals of N channels with field and line scanning frequencies S sn (1+k / the number of scanning lines) and S ln, the N channel component signals are respectively color-encoded as NTSC signals to thereby provide color video signals which then are supplied to N rotary magnetic heads, each rotary magnetic head being rotated at the standard revolution number, and then they are recorded on the magnetic tape running at tape speed N times the standard speed to form the slant track, when N is 4n+1 or 4n−1 (where n=1, 2, 3, ...), the value of k and the arrangement of the color encoder become different in correspondence therewith. That is, when N=4n+1, k is selected to be even and the color encoder may be the ordinary NTSC system encoder. However, when N=4n−1, if k is selected to be odd, the color encoder may be the ordinary NTSC system encoder, while if k is selected to be even, in order to obtain the color video signal with the color framing achieved under the condition of being recorded on the tape, the NTSC system color encoder must be modified so as to invert the phase of the carrier chrominance signal of each channel at every other field.

In the recording and reproducing apparatus for recording and reproducing a video signal obtained from a high speed scanning video camera according to the present invention, when the color video signal of SECAM system is processed, the same color framing operation as in processing the color video signal of NTSC system is required for the color encoder and also k is selected the same as in the NTSC system.

Furthermore, the processing of the color video signal of PAL (phase alteration line) system will be described. When N=8n+1 (N=4n+1 where n is even)(where n=1, 2, 3, ...), if k is selected to satisfy k=4t (t=1, 2, 3, ...), the color encoder may be the encoder of ordinary PAL system, while when N=8n−3 (N=4n+1 where n is odd) (where n=1, 2, 3, ...), if k is selected to satisfy k=4t+2, the color encoder may be the encoder of ordinary PAL system. However, when k is selected to satisfy k=4t, the color encoder of the PAL system at the later stage of the D/A converter must be modified so as to allow the color video signal with the color framing achieved to be produced on the magnetic tape.

Consequently, when N is an odd number of 3 or above, the arrangement of the color encoder is made simple. However, if the arrangement of the color encoder is not taken into consideration, N may be even.

When the video signal undergoes the color encoding processing before the line scanning speed of the video signal is compressed to (1+k/ the number of scanning lines ), k may be an arbitrary natural number.

According to the above recording and reproducing apparatus for recording and reproducing a video signal obtained from a high speed scanning video camera of the invention, the video signal obtained from a high speed scanning video camera can be recorded on a magnetic tape so as to be reproduced by the rotary magnetic head at sufficiently low tape speed without causing any disturbance in the vertical synchronization and the dropping of the picture. In addition, the video signal obtained from the high speed scanning video camera can be recorded on the magnetic tape with the standard recording pattern.

The above description is given on a single embodiment of the invention, but it will be apparent that many modifications and variations could be effected by one skilled in the art without departing from the spirit or scope of the novel concepts of the invention, so that the scope of the invention should be determined by the appended claims only.

We claim as our invention:

1. Apparatus for recording and reproducing on or from a magnetic recording tape a high speed video signal obtained from a high speed scanning video camera having a scanning speed N times the scanning speed of a standard video camera generating a standard television video signal, where N is an integer equal to or greater than 2; said apparatus comprising:
    means for driving said magnetic recording tape to run at tape speed N times the tape speed of a standard recording and reproducing apparatus;
    means for dividing said high speed video signal into N channels of video signals;
    means for expanding the time axis of said high speed video signal so that each of said N channels of video signals is slightly compressed as compared to said standard television video signal;
    means for modulating each of said video signals the time axes of which are expanded; and
    recording and reproducing means including a rotary drum having N rotary magnetic heads mounted on the circumference thereof with an equal angular distance therebetween to record each of said modulated video signals on said magnetic recording tape as successive tracks and a playback head mounted on said circumference at a predetermined position, the diameter of said rotary drum being in a predetermined relation to that of said standard magnetic recording and reproducing apparatus.

2. Apparatus according to claim 1, wherein said time axis expanding means comprises a time axis expanding circuit for expanding the time axis of said high speed video signal so as to become equal to that of said standard video signa and a time axis compressing circuit for slightly compressing the expanded time axis of said high speed video signal.

3. Apparatus according to claim 2, wherein said time axis compressing circuit compresses said high speed video signal the time axis of which is expanded to be the same as that of said standard television signal to $1+K/S_L$ wherein K: a natrual number
    $S_L$: the number of scanning lines.

4. Apparatus according to claim 1, wherein the diameter of said rotary drum is $$D = \frac{\sqrt{h^2 + (L\cos\theta c - Nvt)^2}}{\sqrt{h^2 + (L\cos\theta c - vt)^2}} \times \left(1 + \frac{k}{S_L}\right) \times D_C$$

wherein
    D: the diameter of said rotary drum
    k: a natural number
    $S_L$: the number of scanning lines
    h: length of a video track in the width direction of the tape
    L: video track length of a standard magnetic recording and reproducing apparatus
    θc: video track angle
    Dc: drum diameter of the standard magnetic recording and reproducing apparatus.
    vt: tape speed of the standard magnetic recording and reproducing apparatus.

* * * * *